(12) United States Patent
Ishigami et al.

(10) Patent No.: US 6,712,329 B2
(45) Date of Patent: Mar. 30, 2004

(54) VEHICLE MIRROR DEVICE ASSEMBLY AND METHOD OF ASSEMBLING VEHICLE MIRROR DEVICE

(75) Inventors: Narumi Ishigami, Niwa-gun (JP); Eiichi Hayakawa, Niwa-gun (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 10/098,490

(22) Filed: Mar. 18, 2002

(65) Prior Publication Data

US 2002/0130239 A1 Sep. 19, 2002

(30) Foreign Application Priority Data

Mar. 19, 2001 (JP) .................................... 2001-079502
May 23, 2001 (JP) .................................... 2001-154509

(51) Int. Cl.$^7$ ................................................ A47F 7/14
(52) U.S. Cl. ................................................ 248/475.1
(58) Field of Search ..................... 248/475.1, 488, 248/477, 466; 359/872, 841, 876, 877, 881

(56) References Cited

U.S. PATENT DOCUMENTS

| | | | | |
|---|---|---|---|---|
| 4,606,619 A | * | 8/1986 | Yamana | 248/549 |
| 5,227,924 A | * | 7/1993 | Kerper | 359/875 |
| 5,245,480 A | * | 9/1993 | Polzer | 359/841 |
| 5,313,336 A | * | 5/1994 | Sakao et al. | 359/841 |
| 5,781,353 A | * | 7/1998 | Seubert et al. | 359/841 |
| 6,109,586 A | * | 8/2000 | Hoek | 248/476 |
| 6,116,743 A | * | 9/2000 | Hoek | 359/871 |
| 6,217,181 B1 | * | 4/2001 | Lynam et al. | 359/879 |
| 6,310,738 B1 | * | 10/2001 | Chu | 359/883 |
| 6,347,872 B1 | * | 2/2002 | Brechbill et al. | 359/879 |
| 6,382,805 B1 | * | 5/2002 | Miyabukuro | 359/872 |

* cited by examiner

Primary Examiner—Leslie A. Braun
Assistant Examiner—A. Joseph Wujciak, III
(74) Attorney, Agent, or Firm—Nixon Peabody, LLP

(57) ABSTRACT

At the time of assembling a door mirror device for a vehicle, a visor rim is assembled, by an elastic hook, a rigid hook and a contact portion, to a frame to which a retracting mechanism and a mirror surface adjusting mechanism are mounted. Then, by fitting together an engaging hook, a projecting hook, and peripheral edges of a visor cover and the visor rim, the visor rim and the visor cover are assembled.

15 Claims, 18 Drawing Sheets

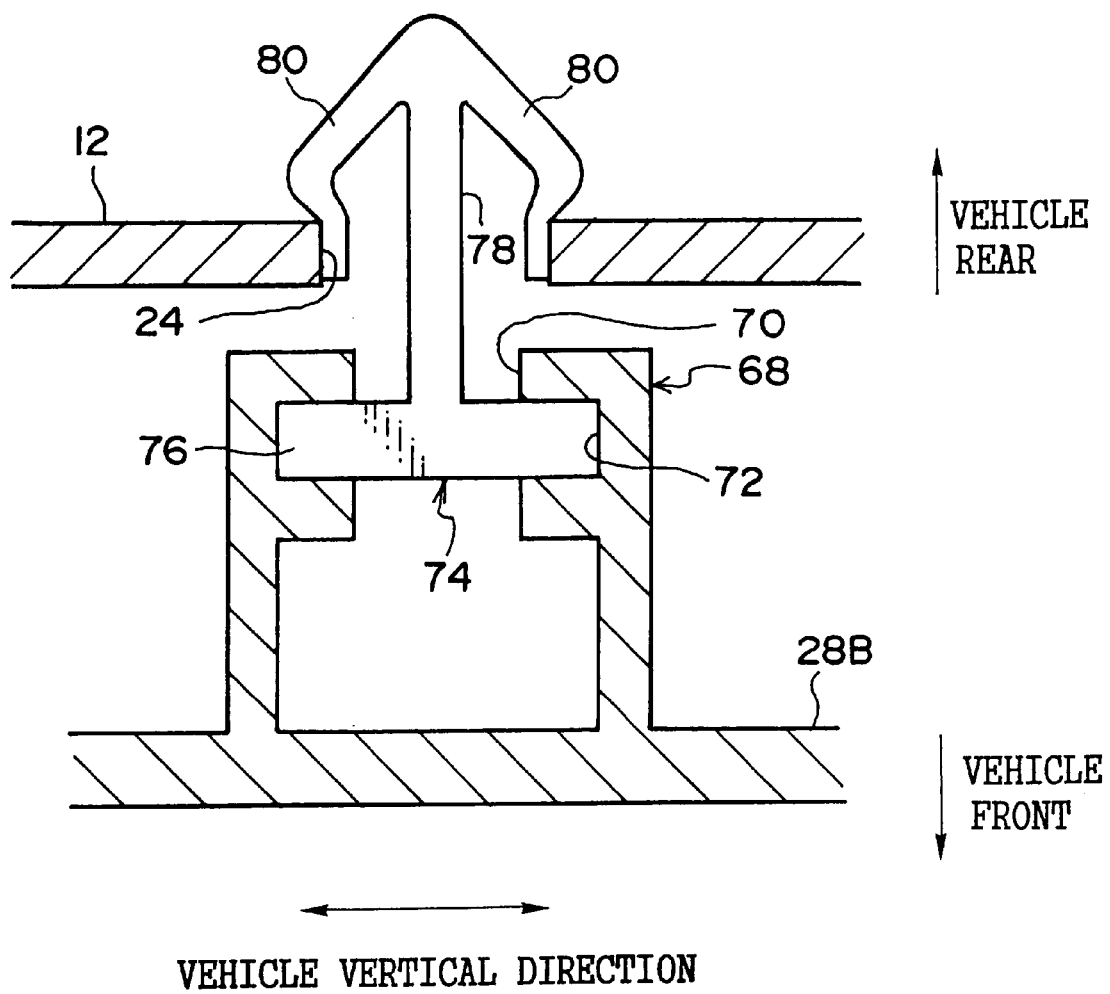

VEHICLE MIRROR DEVICE ASSEMBLY AND METHOD OF ASSEMBLING VEHICLE MIRROR DEVICE

BACKGROUND OF THE INVENTION

1. Field of the Invention

The present invention relates to a mirror device assembly and a method for assembling a mirror device for a vehicle, for example, a door mirror device of an automobile.

2. Description of the Related Art

A door mirror device for a vehicle is equipped with, for example, a door mirror stay. The door mirror stay is fixed to a door of a vehicle. A retracting mechanism is mounted to the door mirror stay, and is mounted to a metal frame. A mirror surface adjusting mechanism is fixed to the frame, and a mirror for visual confirmation of the region substantially toward the rear of the vehicle is mounted to the mirror surface adjusting mechanism. A resin door mirror visor is assembled to the frame. The door mirror visor covers the vehicle front side of the mirror. The retracting mechanism, the frame, and the mirror surface adjusting mechanism are accommodated at the interior of the door mirror visor.

The door mirror device is equipped with the mirror for visual confirmation of the region substantially toward the rear of the vehicle, and is mounted to the outer side of a front door via the door mirror stay. The angle of the mirror can be adjusted by the mirror surface adjusting mechanism, and the mirror can be collapsed by the retracting mechanism.

By operating the retracting mechanism, the mirror is either retracted or extended. By operating the mirror surface adjusting mechanism, the angle of the mirror surface of the mirror is adjusted.

Development continues of door mirror visors which are structured such that the visor cover at the vehicle front side and a visor rim at the vehicle rear side are assembled together. In a door mirror visor of such a structure, the visor cover and the visor rim are respectively fixed to a frame so as to be assembled to the frame.

However, in this door mirror device for a vehicle, the visor rim is fastened to the frame by four screws. The visor cover is fixed to the frame by using three so-called fasteners (clips) which are separate parts.

Thus, a total of seven fastening parts, which are the four screws and the three fasteners, are required. Not only are the costs high, but also, there are the problems that tools for assembly are needed, the number of assembly processes is large, and the assembly work is complex.

Further, there are door mirror devices for vehicles in which elastic engaging claws are provided at the visor rim. In such door mirror devices for vehicles, the visor rim is fixed to the frame by the engaging claws engaging the frame.

However, in such a door mirror device for a vehicle, the resin engaging claws of the visor rim are engaged in a state in which they apply elastic force, toward the front of the vehicle or toward the rear of the vehicle, to the metal frame. In such a structure, there is the problem that the engaging claws break as they apply stress to the frame if the frame gradually corrodes.

Further, the mirror frame is metal, and the visor rim and the visor cover are formed from a synthetic resin. In particular, there is the concern that the fastening by using the screws will apply excessive stress to the visor. Moreover, the need for the separate fastening parts and the need for the tools therefor impede facilitation of the work.

SUMMARY OF THE INVENTION

In view of the aforementioned, an object of the present invention is to provide a mirror device assembly for a vehicle in which breakage of a mirror visor can be prevented and which aims for lower costs and easier assembly work, and to provide a mirror device assembly for a vehicle which aims for lower costs and easier assembly work.

Another object of the present invention is to provide a method for assembling a mirror device for a vehicle which aims for a mitigation of the stress load applied to a mirror visor, a reduction in the number of parts, and a reduction in the number of assembly processes.

A first aspect of the present invention is a mirror device assembly for a vehicle, the mirror device assembly comprising: a mirror and a mirror visor which covers a vehicle front side of the mirror for visual confirmation of a region substantially toward a rear of the vehicle; a frame disposed in an inner portion of the mirror visor and connected to the mirror and connected to the vehicle for fixing the mirror visor and the mirror to the vehicle body; an elastic hook provided at the mirror visor, which applies to the frame elastic force in a direction substantially orthogonal to a vehicle longitudinal direction of the vehicle; a rigid hook provided at the mirror visor in correspondence with the elastic hook, and which is rigid, which receives elastic force applied to the frame by the elastic hook; and a first impeding device provided at at least one of the mirror visor and the frame, which impedes relative movement, in the vehicle longitudinal direction, of the mirror visor and the frame without applying elastic force to the frame.

In the structure for assembling a mirror device for a vehicle of the first aspect of the present invention, the elastic hook which is provided at the mirror visor applies, to the frame, elastic force in a direction substantially orthogonal to the vehicle longitudinal direction. On the other hand, the rigid hook, which is provided at the mirror visor in correspondence with the elastic hook, receives the elastic force applied to the frame by the elastic hook. Moreover, the first impeding device, which is provided at at least one of the mirror visor and the frame, impedes relative movement, in the vehicle longitudinal direction, between the mirror visor and the frame. In this way, the frame is assembled to the interior of the mirror visor.

Here, at the time when the first impeding device impedes the relative movement, in the vehicle longitudinal direction, between the mirror visor and the frame, elastic force is not applied to the frame. Thus, even if the frame is made of metal, it is possible to prevent the mirror visor from receiving the stress from the frame and breaking as was the case in the conventional art.

Moreover, because the mirror visor and the frame are assembled together by the elastic hook, the rigid hook and the first impeding device, there is no need for fastening parts as in the conventional art. In this way, costs can be reduced, tools for assembly are unnecessary, the number of assembly processes can be reduced, and the assembly work can be facilitated.

A second aspect of the present invention is a mirror device assembly for a vehicle, the mirror device assembly comprising: a mirror and a mirror visor, the mirror visor including a vehicle front side visor cover and a vehicle rear side visor rim assembled to one another, and which covers a vehicle front side of the mirror for visual confirmation of a region substantially toward a rear of the vehicle; a projecting hook provided at one of the visor cover and the visor rim, the projecting hook including a distal end which projects and a widened portion which widens toward both sides of the distal end; an engaging hook which corresponding to the projecting hook, the engaging hook comprising a pair of elastic nipping claws, and which is provided at another of the visor cover and the visor rim, and which engages with the widened portion due to the pair of nipping claws nipping the widened portion; and an impeding device provided at at least one of the visor cover and the visor rim, and which impedes relative movement, in a longitudinal direction of the vehicle, of the visor cover and the visor rim when mounted to the vehicle.

In the structure for assembling a mirror device for a vehicle of the second aspect of the present invention, the pair of nipping claws of the engaging hook, which is provided at one of the visor cover and the visor rim of the mirror visor, engage with the widened portion by nipping, from the widening directions, the widened portion at the distal end of the projecting hook provided at the other of the visor cover and the visor rim. Further, the impeding device, which is provided at at least one of the visor cover and the visor rim, impedes relative movement, in the vehicle longitudinal direction, of the visor cover and the visor rim. In this way, the visor cover and the visor rim are assembled together.

Here, because the visor cover and the visor rim are assembled by the engaging hook, the projecting hook and the impeding device, there is no need for fastening parts as in the conventional art. Therefore, the costs can be lowered, and the assembly work can be facilitated because tools for assembly are not needed and the number of assembly processes can be reduced.

In the structure for assembling a mirror device for a vehicle of the second aspect of the present invention, preferably, at least one of engaging surfaces of the nipping claws which engage the widened portion and engaged surfaces of the widened portion which are engaged by the nipping claws, are formed as inclined surfaces.

In this structure for assembling a mirror device for a vehicle, at least one of engaging surfaces of the nipping claws which engage the widened portion, and engaged surfaces of the widened portion which are engaged by the nipping claws, are formed as inclined surfaces. Thus, the engaging surfaces and the engaged surfaces are satisfactorily engaged, and the nipping claws can always satisfactorily push the widened portion toward the rear of the vehicle.

More preferably, the structure for assembling a mirror device for a vehicle of the second aspect of the present invention further comprises an open hole which is formed in the widened portion in a state of being open from a widening direction end edge of the widened portion, a gap being formed between the open hole and a projecting hook side end surface of the nipping claw.

In this structure for assembling a mirror device for a vehicle, the open hole which is formed in the widened portion is open from the widening direction end edge of the widened portion. A gap is formed between the open hole and the projecting hook side end surface of the nipping claw. Thus, by inserting, for example, a screwdriver or pliers (so-called snap ring pliers or the like) into this gap, the nipping claws can be moved apart from the widened portion, and the engagement of the nipping claws with the widened portion can be cancelled. Accordingly, the canceling of the engagement of the engaging hook with the projecting hook can be carried out without using a special tool. The visor cover and the visor rim can thereby be easily removed.

Further, when the visor cover and the visor rim are easily removed in this way, it is easy to replace the internal parts of the mirror visor such as, for example, the frame, the retracting mechanism, the mirror surface adjusting mechanism or the like. Moreover, with the internal parts of the mirror visor not assembled, the visor cover and the visor rim can be assembled and painted. Thereafter, the visor cover and the visor rim can be temporarily removed, and the internal parts can be assembled within the mirror visor. Thus, the visor cover and the visor rim can easily and satisfactorily be painted the same color.

In the structure for assembling a mirror device for a vehicle of the second aspect, more preferably, the nipping claws project from the widened portion in a direction orthogonal to the directions of widening.

In this structure for assembling a mirror device for a vehicle, the nipping claws project, from the widened portion, in a direction orthogonal to the widening directions. Thus, by applying force to the projecting portion and making the nipping claws move apart from the widened portion, the engagement of the nipping claws with the widened portion can be cancelled. Accordingly, the canceling of the engagement of the engaging hook with the projecting hook can be carried out with out using a special tool. The visor cover and the visor rim can thereby easily be removed.

Further, when the visor cover and the visor rim are easily removed in this way, it is easy to replace the internal parts of the mirror visor such as, for example, the frame, the retracting mechanism, the mirror surface adjusting mechanism or the like. Moreover, with the internal parts of the mirror visor not assembled, the visor cover and the visor rim can be assembled and painted. Thereafter, the visor cover and the visor rim can be temporarily removed, and the internal parts can be assembled within the mirror visor. Thus, the visor cover and the visor rim can easily and satisfactorily be painted the same color.

A third aspect of the present invention is a mirror device assembly for a vehicle, the mirror device assembly comprising: a mirror; a mirror frame mountable to a vehicle, the mirror frame including surface sides with one surface side holding the mirror, the mirror and the one surface side of the mirror frame opposing one another; a visor rim which exposes the mirror to the environment, and which opposes the one surface side of the mirror frame; a visor cover which opposes another surface side of the mirror frame, and which, together with the visor rim, forms a mirror visor which accommodates the mirror frame and covers the mirror; a first communicating portion which is formed in the mirror frame and which defines a path of fluid communication; a visor rim side anchor piece formed integrally with an inner side of the visor rim so as to extend toward the mirror frame, and when the visor rim is assembled to the mirror frame, the visor rim side anchor piece elastically deforms in a direction substantially orthogonal to an extending direction of the visor rim side anchor piece and abuts and anchors on the first communicating portion; a second communicating portion which is formed in the mirror frame and which defines a path of fluid communication from one surface side of the mirror frame to another surface side of the mirror frame; a visor cover side anchor piece formed integrally with an inner side of the visor cover so as to extend toward the mirror frame, when the visor cover is assembled to the mirror frame, the visor cover side anchor piece elastically deforms in a direction substantially orthogonal to an extending direction of the visor cover side anchor piece and abuts and anchors on the second communicating portion; a visor cover side impeding piece formed integrally with the visor cover, and when the visor rim and the cover are assembled to one another, the visor cover side impeding piece, via the first communicating portion, abuts and engages with the visor rim side anchor piece so as to impede anti-anchoring deformation of the visor rim side anchor piece; and a visor rim side impeding piece formed integrally with the visor rim, and when the visor cover and the rim are assembled to one another, the visor rim side impeding piece, via the second communicating portion, abuts and engages with the visor cover side anchor piece so as to impede anti-anchoring deformation of the visor cover side anchor piece.

The structure for assembling a mirror device for a vehicle of the third aspect of the present invention preferably has the following structure. One of the visor rim and the visor cover is assembled before another of the visor rim and the visor cover. The anchor piece of the one which is assembled first is formed by a pair of anchor pair pieces which oppose one another and are set apart from one another and whose direction of being set apart from one another is a direction of anti-anchoring deformation. The impeding piece of the other which is assembled after is formed by a fit-together piece which is fit together between pieces of the anchor pair pieces. The impeding piece of the one which is assembled first is formed by an elastic piece which elastically deforms in accordance with a deformation needed to anchor the anchor piece of the other which is assembled after, and which permits deformation which is needed for the anchoring.

In the structure for assembling a mirror device for a vehicle of the third aspect of the present invention, more preferably, the one of the visor rim and the visor cover which is assembled first is the visor rim, and the other of the visor rim and the visor cover which is assembled after is the visor cover.

In accordance with this structure, assembly can be carried out as follows for example.

First, the mirror frame is set, for example, at a reference jig.

Next, the visor rim is assembly moved toward the mirror frame. Accompanying this movement, the visor rim side anchor piece elastically deforms in a direction substantially orthogonal to the direction in which this anchor piece extends, and this anchor piece abuts and anchors on the first communicating portion of the mirror frame. In this way, the assembly of the visor rim to the mirror frame is carried out.

Next, the visor cover is assembly moved toward the mirror frame. Accompanying this movement, the visor cover side anchor piece elastically deforms in a direction substantially orthogonal to the direction in which this anchor piece extends, and this anchor piece abuts and anchors on the second communicating portion. In this way, the assembly of the visor cover to the mirror frame is carried out.

By assembling the visor rim and the visor cover, the mirror visor which houses the mirror frame and covers the rear side of the mirror is formed.

In accordance with the assembly movement of the visor rim and the visor cover, further, the visor cover side impeding piece passes through the first communicating portion and abuts and engages with the visor rim side anchor piece, and anti-anchoring deformation of the visor rim side anchor piece (deformation needed for canceling anchoring of the anchor piece) is impeded. Simultaneously, the visor rim side impeding piece passes through the second communicating portion and abuts and engages with the visor cover side anchor piece, and anti-anchoring deformation of the visor cover side anchor piece (deformation needed for canceling anchoring of the anchor piece) is impeded.

In this way, the assembly of the visor rim and the visor cover to the mirror frame is strengthened. Further, the respective anchor pieces and the respective impeding pieces are formed integrally with the visor rim and the visor cover. Assembly is carried out without readying other parts or tools. Even if the visor rim and the visor cover are made of a synthetic resin, excessive stress is not applied thereto.

As a result, a mitigation of the stress load applied to the mirror visor, a reduction in the number of parts, a reduction in the number of assembly processes, and facilitation of the assembly work are achieved.

Although it has been described that assembly of the visor rim is carried out before assembly of the visor cover, the invention recited in claim 1 is not limited to the same, and assembly may be carried out in the reverse order or may be carried out simultaneously.

In a preferable structure of the third aspect of the present invention, one of the visor rim and the visor cover is assembled first. In an even more preferable structure, the visor rim is assembled first.

In accordance with the more preferable structure of the third aspect in which the visor rim is assembled first, due to the assembly movement of the visor rim, the anchor pair pieces, which serve as the visor rim side anchor piece, abut and anchor on the second communicating portion as they elastically deform in directions of narrowing the space between the pieces of the anchor pair pieces. The space between the pieces of the anchor pair pieces changes throughout the course of the operation for anchoring the anchor pair pieces. However, when the visor cover is assembled, the operation for anchoring the anchor pair pieces is already completed. Thus, there is no change in the space between the pieces of the anchor pair pieces. Accordingly, due to the assembly movement of the visor cover, the fit-together piece, which serves as the visor cover side impeding piece, easily abuts and fits together between the pieces of the anchor pair pieces. The fit-together piece is, for example, press-fit between the pieces of the anchor pair pieces.

Due to the elastic piece, which serves as the visor rim side impeding piece, the visor cover side anchor piece elastically deforms, and abuts and engages the mirror frame. The deformation at this time is permitted by the elastic deformation of the elastic piece. There is no hindrance due to the assembly of the visor cover being carried out after the assembly of the visor rim.

The same operation and effects are achieved in a case in which the visor cover is assembled first. However, the third aspect of the present invention in which the visor rim is assembled first is effective for the following reasons.

After assembly, if the need arises to remove the visor rim and the visor cover, it suffices to elastically deform the elastic piece, and to carry out anti-anchoring deformation of the anchor piece. To this end, there is the need to abut the elastic piece. The portion of the visor rim, which portion corresponds to the back surface of the mirror, is usually hidden by the mirror. Places which can abut the elastic piece can be formed at this portion. By removing the mirror, the work for abutting the elastic piece can be carried out, and the external appearance and design of the mirror visor are not affected in any way.

BRIEF DESCRIPTION OF THE DRAWINGS

FIG. 11 is a cross-sectional view showing in detail an engaged state of a clip and the insert-through hole relating to another example of the door mirror device for a vehicle.

DESCRIPTION OF THE PREFERRED EMBODIMENTS (First Embodiment)

Figure 1:
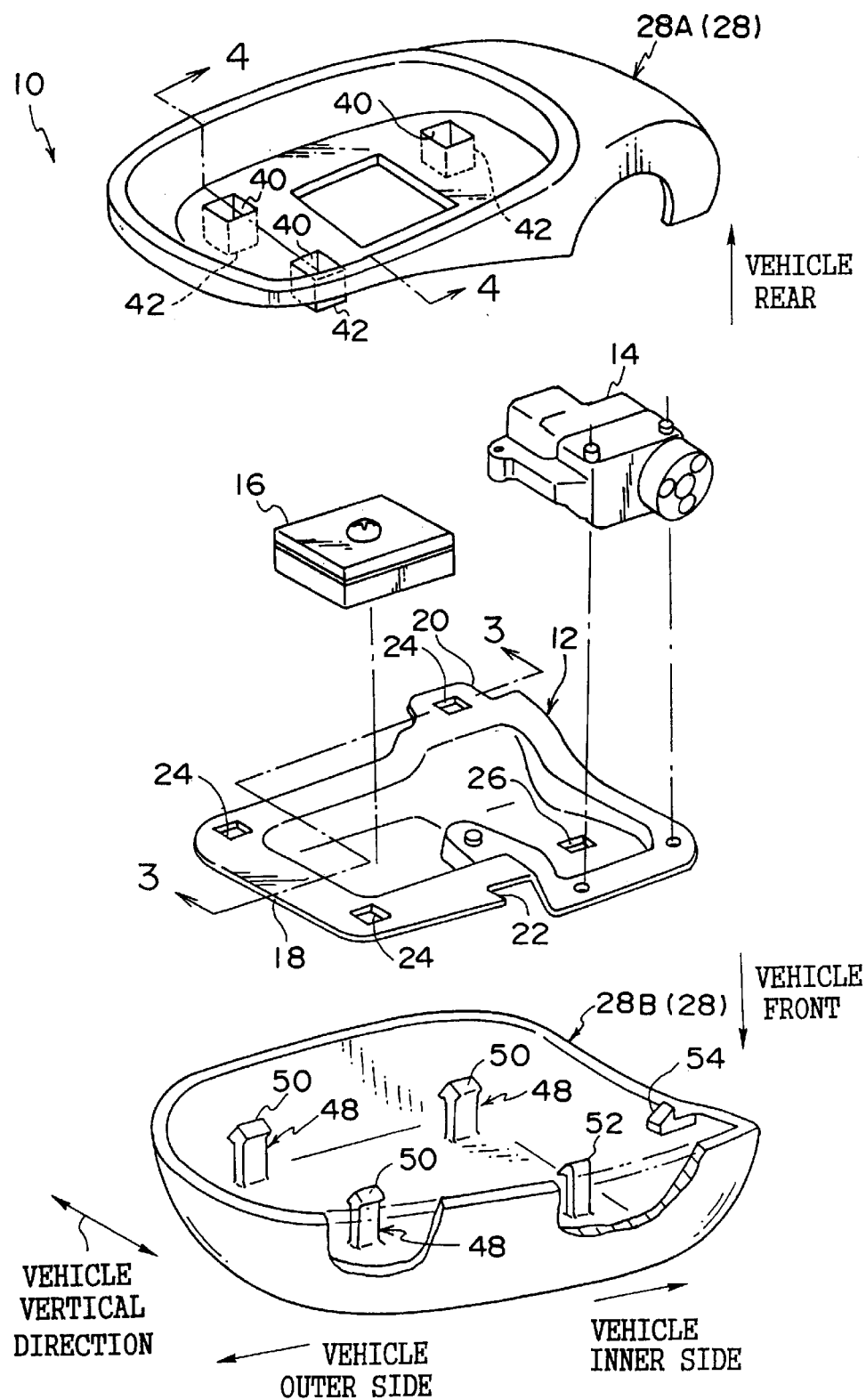
FIG. 1 is an exploded perspective view showing a door mirror device for a vehicle relating to an embodiment of the present invention.

In FIG. 1, a door mirror device 10 for a vehicle, to which the structure for assembling a mirror device for a vehicle of the present invention is applied, is shown in an exploded perspective view.

The door mirror device 10 for a vehicle is equipped with a metal frame 12. A retracting mechanism 14 is mounted to the vehicle inner side of the frame 12. A door mirror stay (not shown) is mounted to the retracting mechanism 14, and is fixed to a door (not shown) of a vehicle. The frame 12 is thereby connected to the vehicle body.

A mirror surface adjusting mechanism 16 is mounted to the vehicle outer side of the frame 12. A mirror (not shown) for visual confirmation of the region substantially at the rear of the vehicle is mounted to the vehicle rear side of the mirror surface adjusting mechanism 16. In this way, the frame 12 is connected to the mirror, and the mirror is fixed to the vehicle body by the frame 12.

By operating the retracting mechanism 14, the frame 12 rotates such that the mirror is either retracted or extended. By operating the mirror surface adjusting mechanism 16, the mirror is inclined such that the angle of the mirror surface thereof is adjusted.

An elastic receiving portion 18 which is planar is formed at the central portion of the vehicle outer side end portion of the frame 12. A first rigid receiving portion 20, which is L-shaped as seen in plan view, is formed at the vehicle inner side top portion of the frame 12. A second rigid receiving portion 22, which is shaped as a backward L as seen in plan view, is formed at the central portion of the vehicle lower portion of the frame 12.

Rectangular insert-through holes 24 are formed at the vehicle outer side upper end portion and lower end portion of the frame 12, and at the vehicle inner side upper end portion of the frame 12. A rectangular anchor hole 26 is formed in the vehicle inner side lower portion of the frame 12.

The frame 12, the retracting mechanism 14, and the mirror surface adjusting mechanism 16 are accommodated in the interior of a door mirror visor 28 which serves as a mirror visor and is formed from, for example, ABS (acrylonitrile butadiene styrene resin). The door mirror visor 28 covers the vehicle rear side of the mirror. The door mirror visor 28 is connected to the frame 12, and is fixed to the vehicle body by the frame 12. The door mirror visor 28 is formed by a vehicle rear side visor rim 28A and a vehicle front side visor cover 28B. The region of the visor rim 28A, which region opposes the mirror surface adjusting mechanism 16 is open. In this way, the mirror can be mounted to the mirror surface adjusting mechanism 16.

Figure 2:
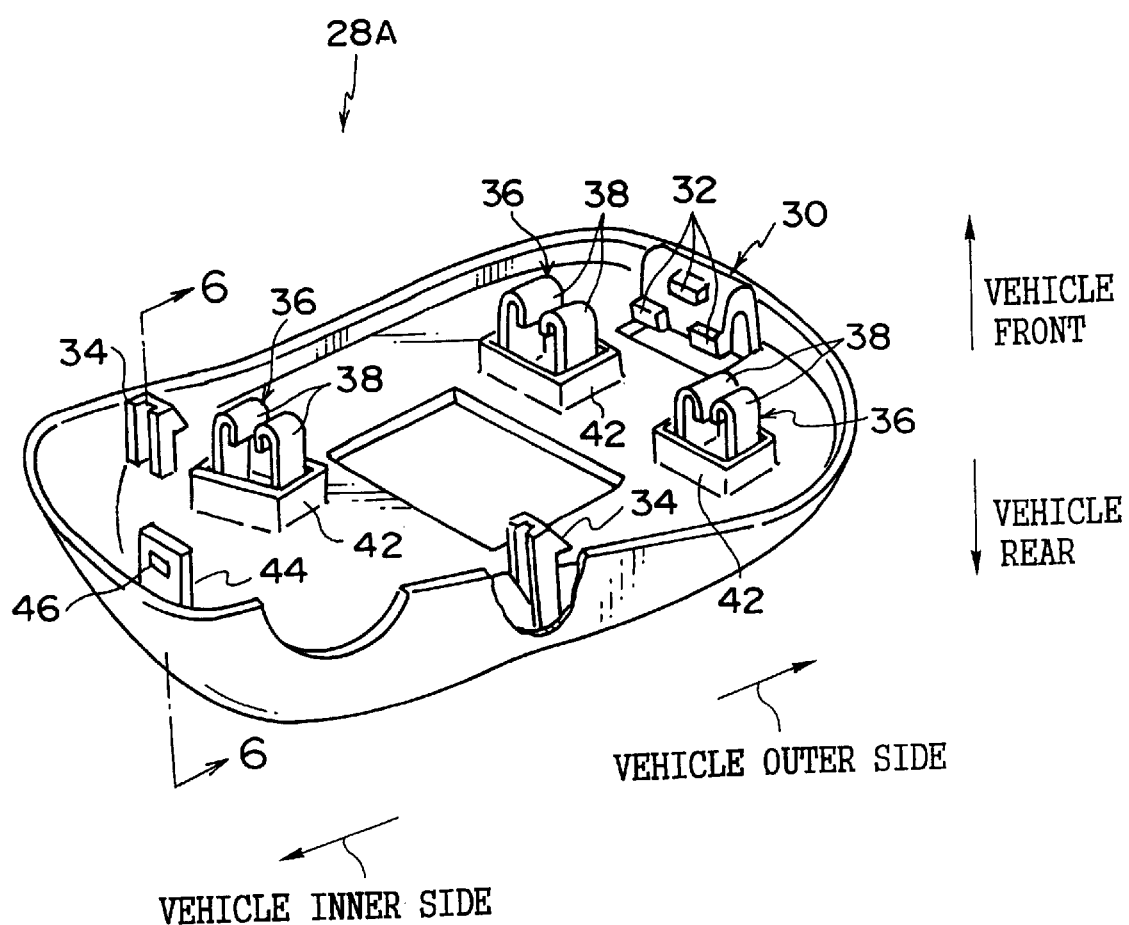
FIG. 2 is a perspective view, as seen from a front of a vehicle, showing a visor rim of the door mirror device for a vehicle.
Figure 3:
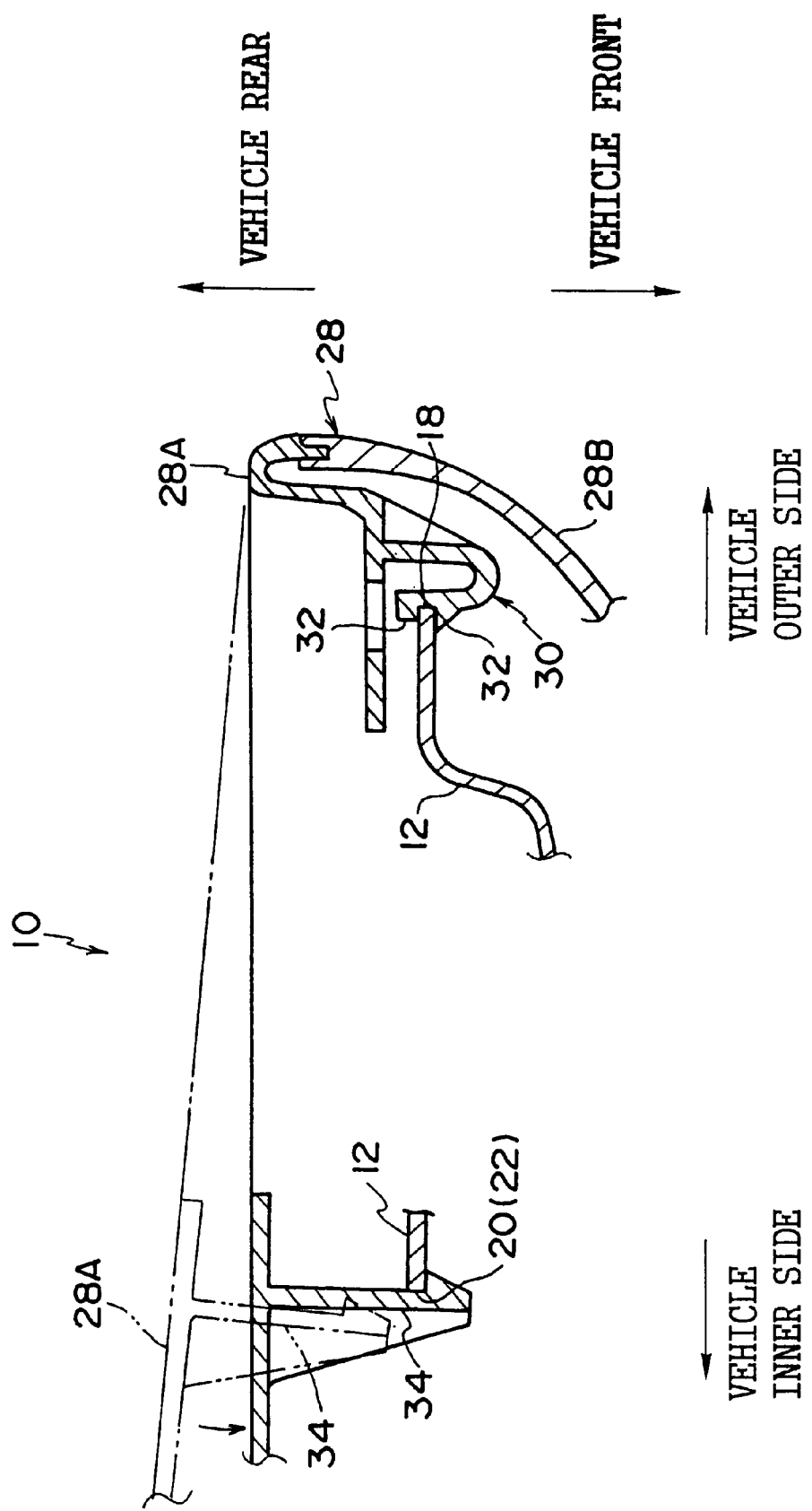
FIG. 3 is a cross-sectional view taken along line 3—3 of FIG. 1, showing an assembled state of the visor rim and a frame of the door mirror device for a vehicle.

As shown in FIGS. 2 and 3, an elastic hook 30 is provided at the visor rim 28A so as to correspond to the elastic receiving portion 18 of the frame 12. The elastic hook 30 has a J-shaped cross-section, engages with the elastic receiving portion 18, and applies, to the frame 12, elastic force in a direction substantially perpendicular to the longitudinal direction of the vehicle. In the present embodiment, the elastic hook 30 applies elastic force toward the inner side of the vehicle.

A plurality of engaging projections 32 are formed at the distal end side of the elastic hook 30 so as to be spaced apart from one another at predetermined intervals in the longitudinal direction of the vehicle. In the present embodiment, one engaging projection 32 is formed at the vehicle front side, and two engaging projections 32 are formed at the vehicle rear side. The elastic receiving portion 18 of the frame 12 is nipped between these plural engaging projections 32.

A pair of rigid hooks 34 which are rigid (i.e., which are not elastic) are provided in correspondence with the first rigid receiving portion 20 and the second rigid receiving portion 22 of the frame 12 and in correspondence with the elastic hook 30. Each rigid hook 34 is formed in a substantial rod-shape. The rigid hooks 34 engage with the first rigid receiving portion 20 and the second rigid receiving portion 22, and receive the elastic force which the elastic hook 30 applies to the frame 12.

The distal end of each rigid hook 34 projects toward the vehicle outer side and forms a first impeding device. Due to the first rigid receiving portion 20 and the second rigid receiving portion 22 of the frame 12 catching on the distal ends of the rigid hooks 34, relative movement of the door mirror visor 28 toward the front of the vehicle with respect to the frame 12 is impeded without elastic force being applied to the frame 12.

The rigid hooks 34 contact, in a horizontal plane, the first rigid receiving portion 20 and the second rigid receiving portion 22 of the frame 12. In this way, relative movement of the door mirror visor 28 in the vehicle vertical directions with respect to the frame 12 is impeded without elastic force being applied to the frame 12.

A predetermined number (three in the present embodiment) of engaging hooks 36 are provided at the visor rim 28A in correspondence with the respective insert-through holes 24 of the frame 12. The engaging hooks 36 are inserted through the respective insert-through holes 24. Each engaging hook 36 is formed by a pair of nipping claws 38. Each nipping claw 38 is formed to have a J-shaped cross-section, and is elastic. The pair of nipping claws 38 oppose one another. The surface (engaging surface) of the distal end of each nipping claw 38 is an inclined surface. A square opening 40 is formed in the wall surface of the visor rim 28A at the vehicle rear side of each engaging hook 38 (see FIG. 5).

A contact portion 42, which is shaped as a rectangular tube, is provided at the visor rim 28A around the entire periphery of the proximal end portion of each engaging hook 36. Each contact portion 42 forms a first impeding device and contacts the frame 12 (see FIGS. 4 and 5). In this way, relative movement, toward the rear of the vehicle, of the door mirror visor 28 with respect to the frame 12 is impeded without elastic force being applied to the frame 12.

A plate-shaped projecting portion 44 is provided at the vehicle inner side bottom portion of the visor rim 28A. A rectangular fit-together hole 46 is formed in the projecting portion 44.

Figure 4:
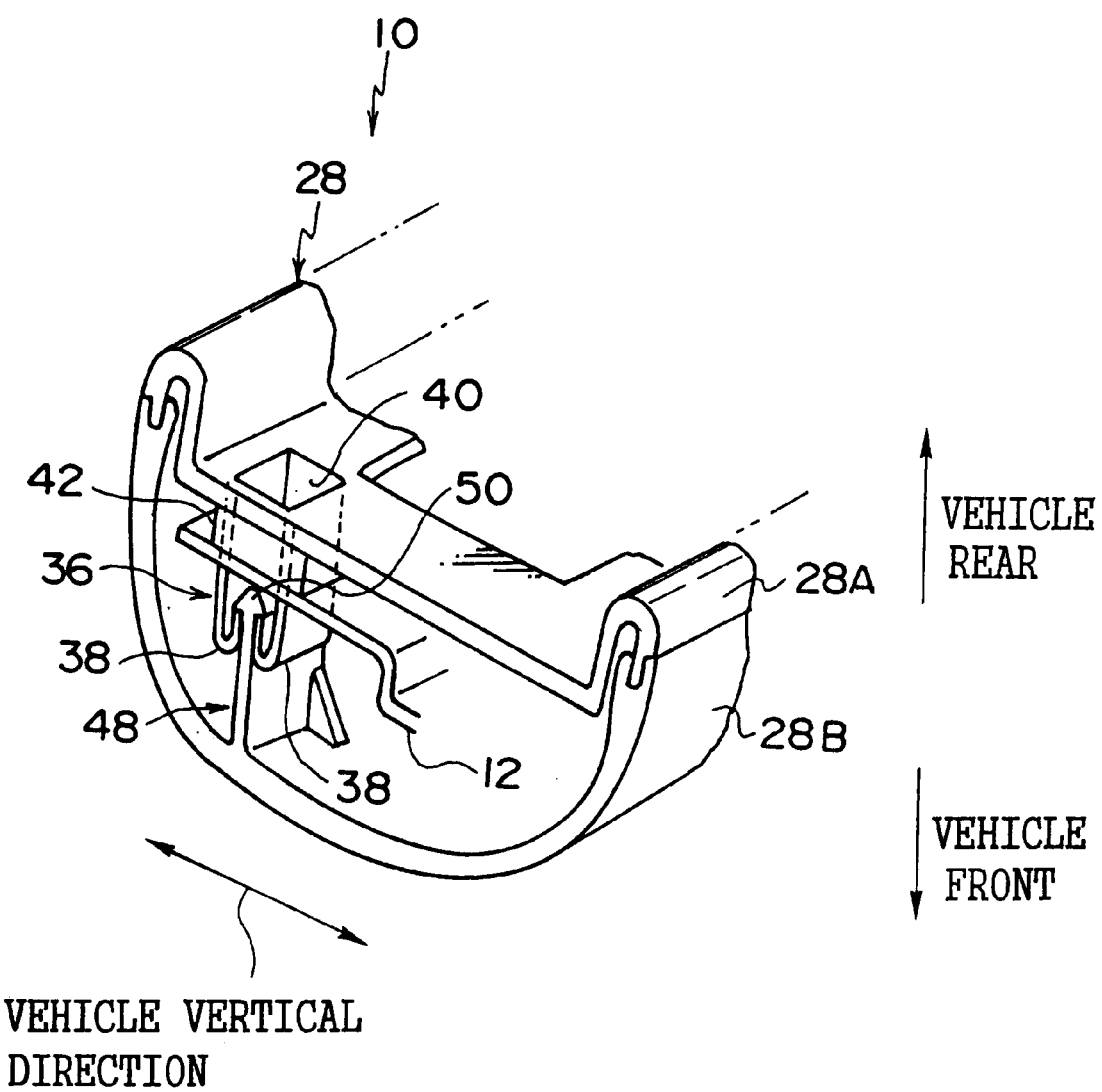
FIG. 4 is a perspective view, which is cut along line 4—4 of FIG. 1, showing an assembled state of the visor rim and a visor cover of the door mirror device for a vehicle.
Figure 5:
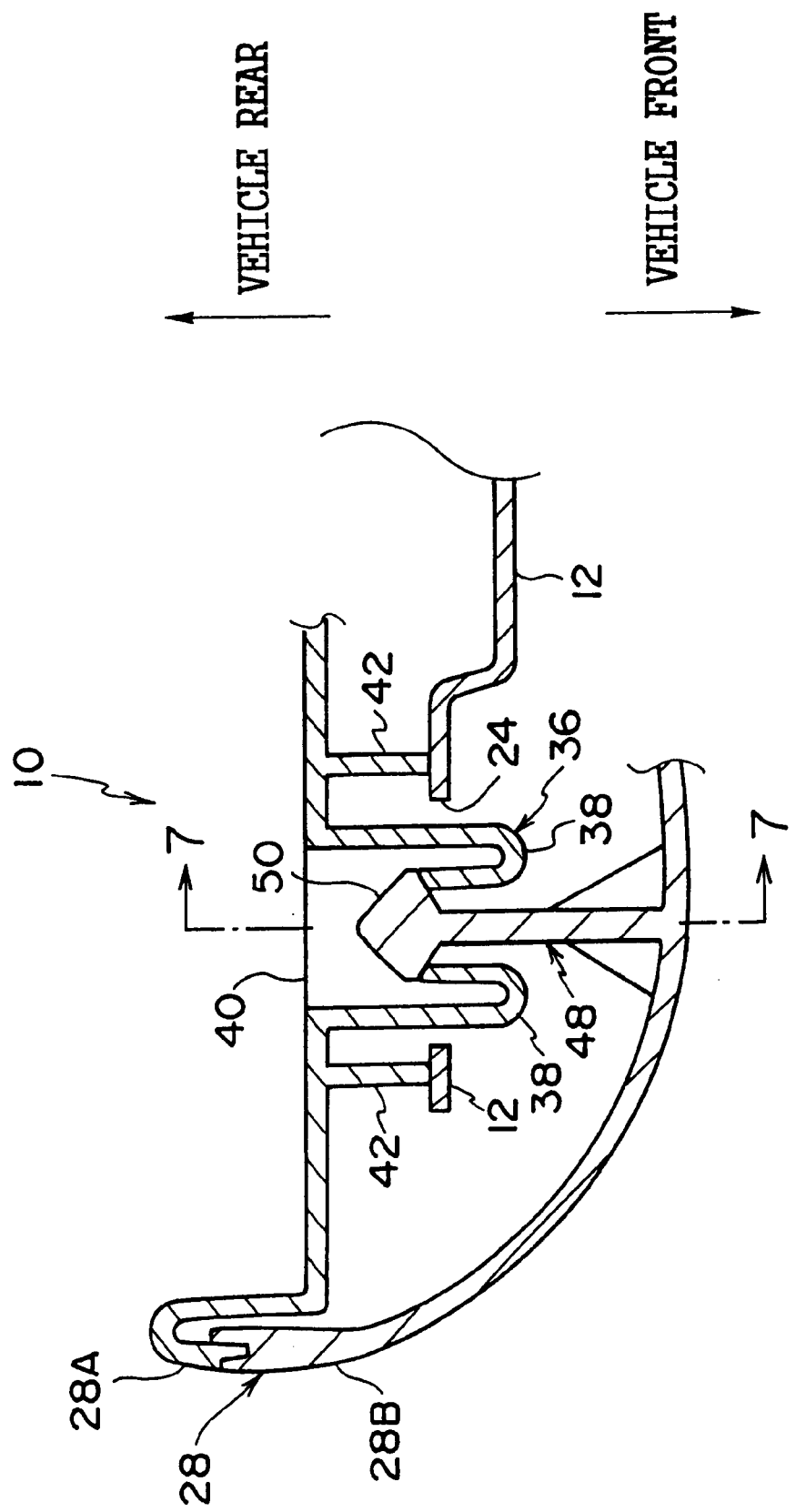
FIG. 5 is a cross-sectional view showing an assembled state of the visor rim and the visor cover of the door mirror device for a vehicle.
Figure 8:
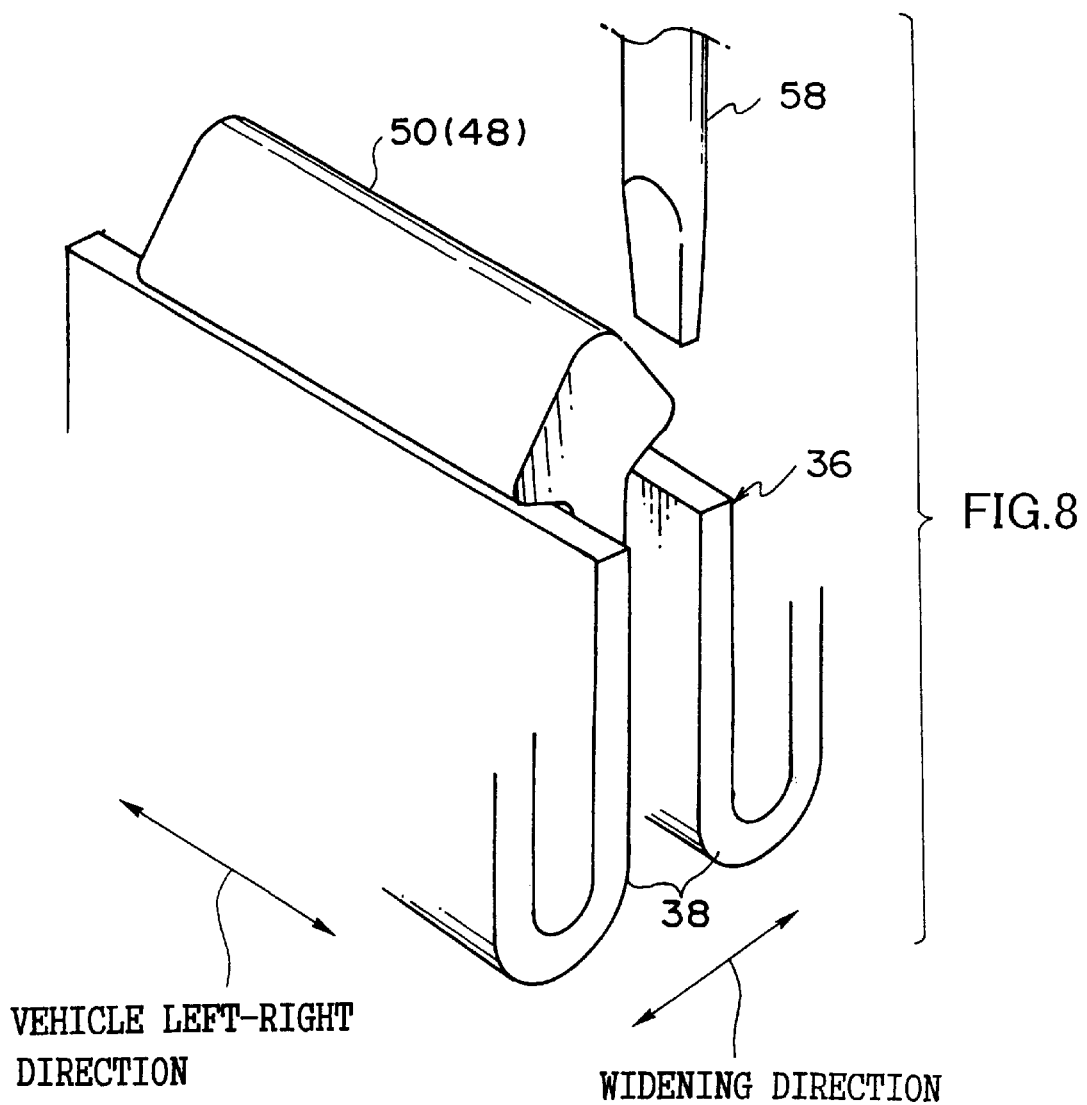
FIG. 8 is a perspective view showing in detail an engaged state of an engaging hook and a projecting hook of the door mirror device for a vehicle.

As shown in detail in FIGS. 4 and 5, a predetermined number (three in the present embodiment) of projecting hooks 48 are provided at the visor cover 28B in correspondence with the respective engaging hooks 36 of the visor rim 28A. Each projecting hook 48 projects toward the visor rim 28A (i.e., toward the rear side of the vehicle). The distal end portion of the projecting hook 48 widens toward both sides in the projecting direction (i.e., widens in the vehicle vertical directions in the present embodiment) so as to form a widened portion 50. Due to the widened portion 50 of the projecting hook 48 being nipped from the widening direction thereof by the pair of nipping claws 38 of the engaging hook 36, the engaging hook 36 engages with the corresponding projecting hook 48. The widened portion 50 has a substantially diamond-shaped cross-section. The vehicle front side surfaces (engaged surfaces) of the widening portion 50, which surfaces are engaged by the distal ends of the nipping claws 38, are formed as inclined surfaces which correspond to the distal end surfaces of the nipping claws 38. Further, as shown in FIG. 8, the nipping claws 38 project from the widening portion 50 in a direction perpendicular to the direction of widening of the nipping claws 38. In the present embodiment, the nipping claws 38 project in the vehicle left-right direction.

An anchor hook 52 is provided at the visor cover 28B in correspondence with the anchor hole 26 of the frame 12, and projects toward the frame 12. The distal end of the anchor hook 52 projects toward one side in a predetermined direction (in the present embodiment, projects toward the top of the vehicle. The anchor hook 52 is anchored on the anchor hole 26 at this distal end of the anchor hook 52.

The visor cover 28B and the visor rim 28A are fit together in a state in which substantially the entire peripheries thereof are superposed one on the other. This fitting-together functions as the impeding device, and in this way, relative movement, in the vehicle longitudinal direction, of the visor cover 28B and the visor rim 28A is impeded.

Figure 6:
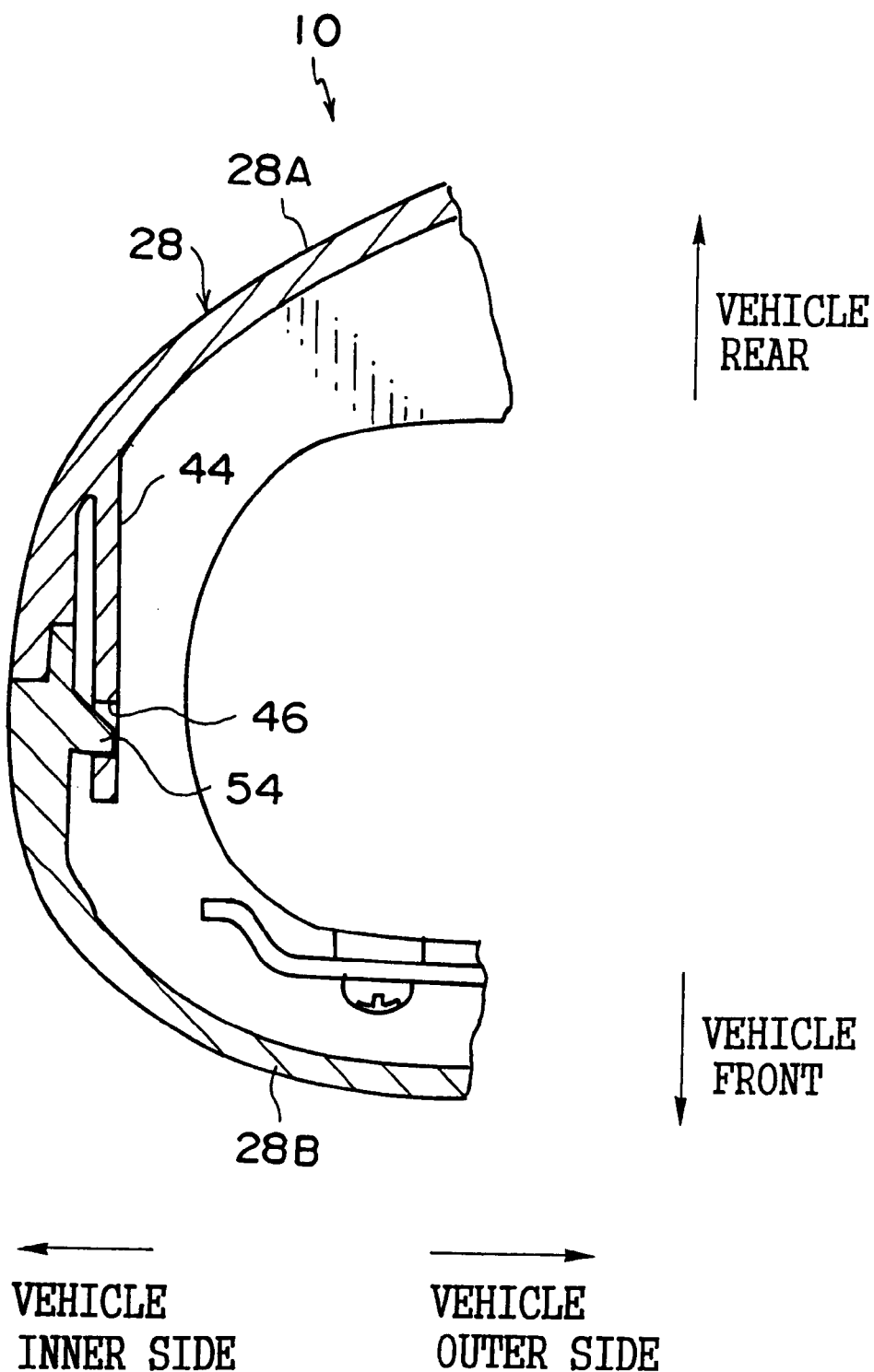
FIG. 6 is a cross-sectional view taken along line 6—6 of FIG. 2, showing a fit-together state of a fit-together projection and a fit-together hole of a projecting portion of the door mirror device for a vehicle.

As shown in detail in FIG. 6, a fit-together projection 54 is provided at the visor cover 28B in correspondence with the projecting portion 44 of the visor rim 28A. The fit-together projection 54 fits together with the fit-together hole 46 of the projecting portion 44.

Figure 7:
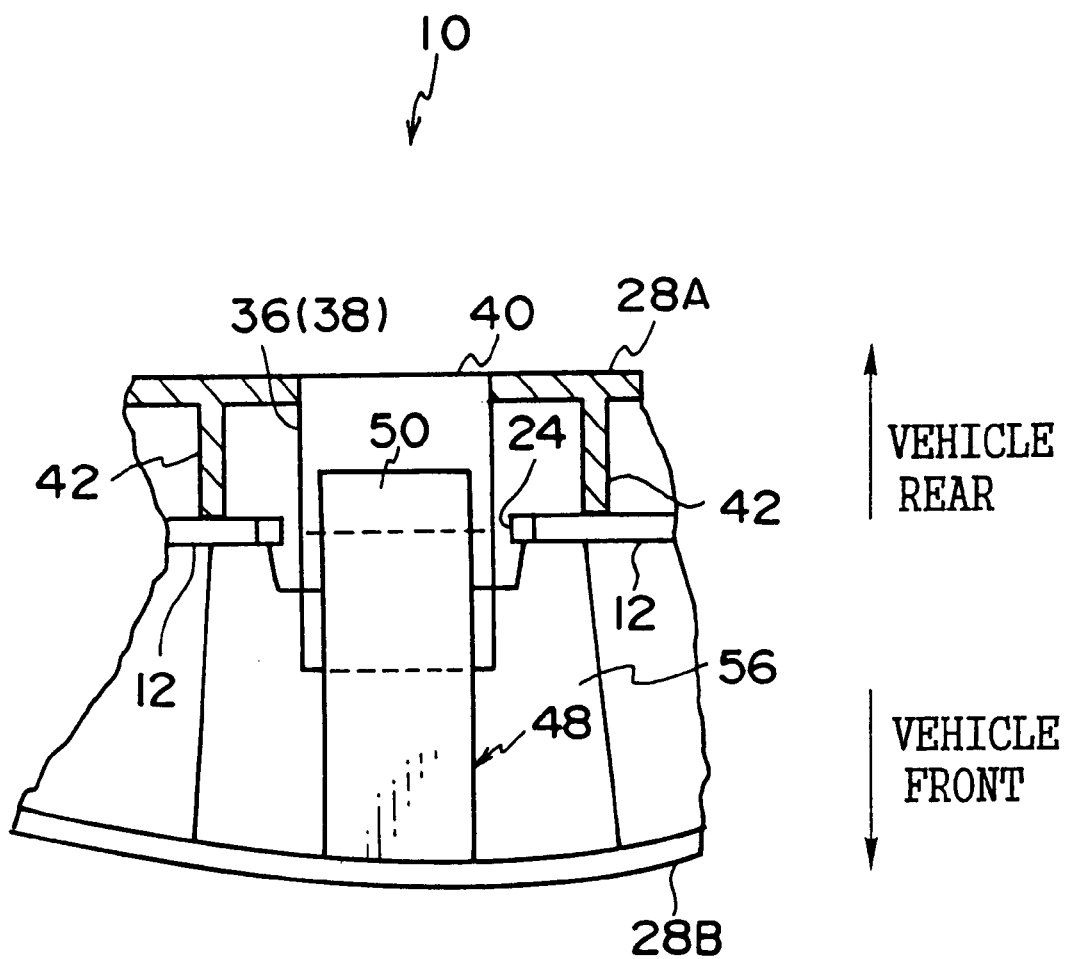
FIG. 7 is a cross-sectional view taken along line 7—7 in FIG. 5, showing a state of contact between the frame and a contact plate of the door mirror device for a vehicle.

As shown in FIG. 7, a plate-shaped contact plate 56 is provided at the visor cover 28B in correspondence with the frame 12. The contact plate 56 stands erect toward the frame 12, and contacts the frame 12 at the distal end thereof. In this way, relative movement of the visor cover 28B, toward the rear of the vehicle, with respect to the frame 12 is impeded.

Next, operation of the present embodiment will be described.

When the door mirror device 10 for a vehicle having the above-described structure is to be assembled, first, the frame 12, which is in a state in which the retracting mechanism 14 and the mirror surface adjusting mechanism 16 are mounted thereto, is set in a reference jig (not shown), and the frame 12 is thereby fixed.

Next, the visor rim 28A is assembled to the frame 12 which is in the above-described state. Specifically, with the elastic receiving portion 18 of the frame 12 nipped between the plurality of engaging projections 32 provided at the elastic hook 30 of the visor rim 28A, the elastic hook 30 is pushed toward the vehicle outer side by the frame 12. The pair of rigid hooks 34 of the visor rim 28A are thereby engaged with the first rigid receiving portion 20 and the second rigid receiving portion 22 of the frame 12, and the elastic force applied to the frame 12 by the elastic hook 30 is received by the rigid hooks 34. At this time, the first rigid receiving portion 20 and the second rigid receiving portion 22 are caught on the distal ends of the rigid hooks 34, and the contact portions 42 of the visor rim 28A contact the frame 12. In this way, relative movement, in the longitudinal direction of the vehicle, of the visor rim 28A with respect to the frame 12 can be impeded without elastic force being applied to the frame 12.

Thereafter, the frame 12 is removed from the reference jig, and the visor rim 28A and the visor cover 28B are assembled. Namely, the projecting hooks 48 of the visor cover 28B are engaged with the engaging hooks 36 of the visor rim 28A which are inserted through the insert-through holes 24 of the frame 12. At this time, the visor cover 28B and the visor rim 28A are fit together along substantially the entire peripheral edges thereof. Relative movement, in the longitudinal direction of the vehicle, between the visor cover 28B and the visor rim 28A is thereby impeded. Moreover, the anchor hook 52 of the visor cover 28B is anchored on the anchor hole 26 of the frame 12, and the fit-together projection 54 of the visor cover 28B is fit together with the fit-together hole 46 of the projecting portion 44 of the visor rim 28A.

The work for mounting the mirror to the mirror surface adjusting mechanism 16 may be carried out at any time after the assembly of the visor rim 28A to the frame 12.

Here, when relative movement, in the longitudinal direction of the vehicle, between the door mirror visor 28 (the visor rim 28A) and the frame 12 is impeded due to the rigid hooks 34 and the contact portions 42, elastic force is not applied to the frame 12. Thus, even if the frame 12 is metal, it is possible to prevent the mirror visor from receiving the stress from the frame and breaking as in the conventional art.

The door mirror visor 28 and the frame 12 are assembled together by the elastic hook 30, the rigid hooks 34, and the contact portions 42. Further, the visor cover 28B and the visor rim 28A are assembled by the engaging hooks 36, the projecting hooks 48, and peripheral edges of the visor cover 28B and the visor rim 28A fitting together. Thus, there is to need for fastening parts as in the conventional art. In this way, costs are low, and the assembly work is facilitated due to assembly tools being rendered unnecessary and the number of assembly processes being reduced.

The engaging surfaces of the nipping claws 38 which engage with the widened portion 50, and the engaged surfaces of the widened portion 50 which are engaged by the nipping claws 38, are formed as inclined surfaces. Thus, the engagement between these engaging surfaces and engaged surfaces is good, and the nipping claws 38 can always reliably push the widened portion 50 toward the rear of the vehicle.

Further, as shown in FIG. 8, the nipping claws 38 of the engaging hook 36 project in the left-right directions of the vehicle from the widened portion 50 of the projecting hook 48. Thus, in the state in which the mirror is removed from the mirror surface adjusting mechanism 16, a jig 58 for removal, such as a screwdriver or pliers (so-called snap ring pliers or the like), is inserted from the opening 40 of the visor rim 28A, and is inserted between the pair of nipping claws 38 at the projecting portion. In this way, the space between the pair of nipping claws 38 can be widened (the nipping claws 38 can be made to move apart from the widened portion 50), and the engaging of the pair of nipping claws 38 with the widened portion 50 can be cancelled. Accordingly, the releasing of the engagement of the engagement hook 36 with the projecting hook 48 can be carried out without using a special tool. The visor cover 28B and the visor rim 28A can thereby easily be removed.

Further, because the visor cover 28B and the visor rim 28A can be easily removed in this way, for example, replacement of the internal parts of the door mirror visor 28, such as the frame 12, the retracting mechanism 14, the mirror surface adjusting mechanism 16 or the like, is easy. Moreover, with the internal parts of the door mirror visor 28 not yet assembled, the visor cover 28B and the visor rim 28A can be assembled together and painted. Thereafter, the visor cover 28B and the visor rim 28A can be temporarily removed, and the internal parts can be assembled in the interior of the door mirror visor 28. Thus, the visor cover 28B and the visor rim 28A can be easily painted well with the same color.

At the time of removing the visor rim 28A from the frame 12, in the state in which the frame 12 is pushed toward the elastic hook 30, the engagement of the frame 12 with the distal ends of the rigid hooks 34 is released. In this way, the visor rim 28A can easily be removed from the frame 12 without the elastic hook 30 or the rigid hooks 34 breaking.

Figure 9:
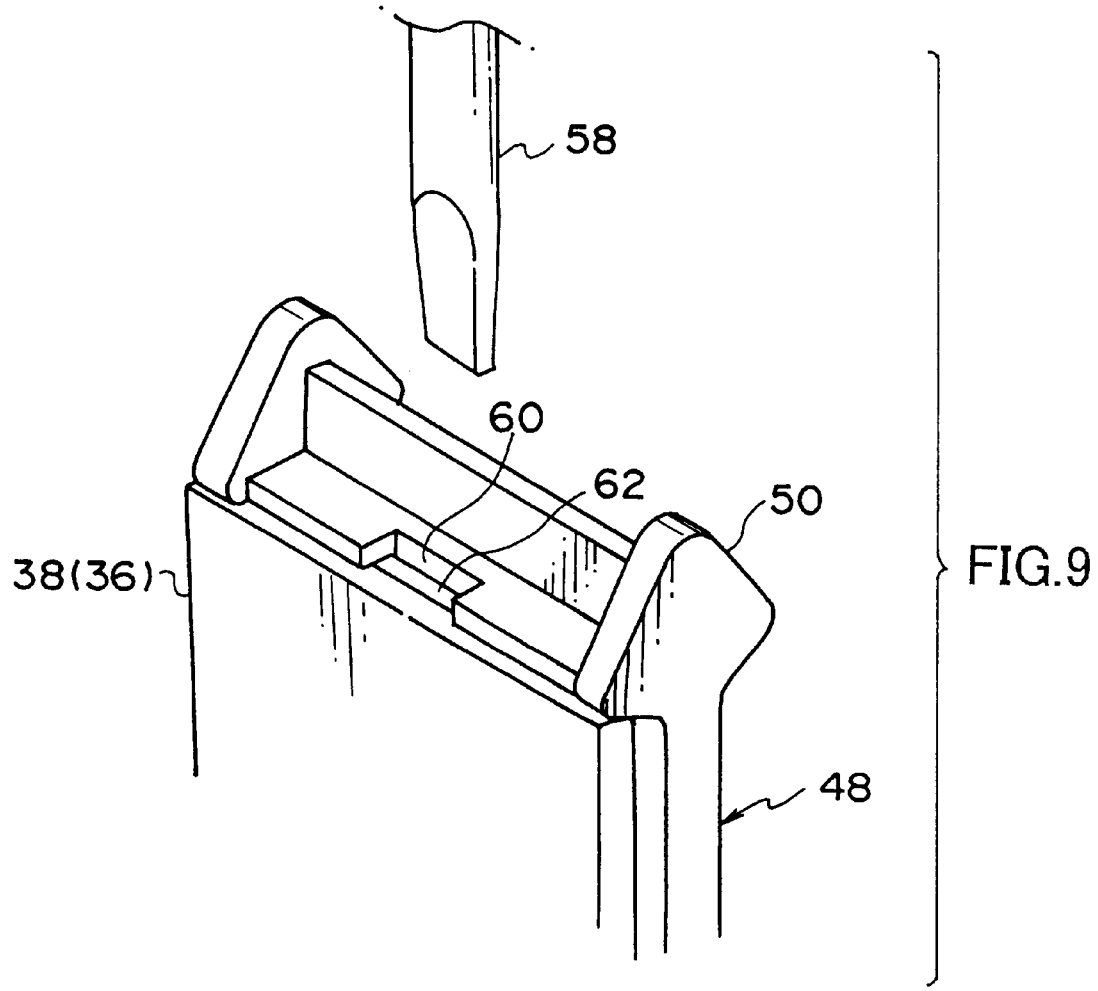
FIG. 9 is a perspective view showing in detail another example of the engaged state of the engaging hook and the projecting hook.

In the present embodiment, the nipping claws 38 of the engaging hook 36 project in both left and right directions of the vehicle from the widened portion 50 of the projecting hook 48. However, as shown in FIG. 9, a structure is possible in which an open hole 60 is formed in the widened portion 50. The open hole 60 is open from the widening direction (vehicle vertical direction) end edge of the widened portion 50. An opening 62 is formed between the open hole 60 and the projecting hook 48 side end surface of the nipping claw 38. With this structure as well, by inserting the jig 58 for removal, such as a screwdriver or pliers (so-called snap ring pliers or the like), into the opening 62, the nipping claw 38 can be made to move away from the widened portion 50, and the engagement of the nipping claw 38 with the widened portion 50 can be cancelled. Accordingly, the releasing of the engagement of the engagement hook 36 with the projecting hook 48 can be carried out without using a special tool. The visor cover 28B and the visor rim 28A can thereby easily be removed.

The elastic force of the elastic hook 30 applies elastic force to the frame 12 in the present embodiment and forces the loosening of the visor rim 28A in the vehicle left-right directions. Such elastic force is within an allowable range of magnitude according to the characteristics of the resin by the required specifications of the door mirror device 10 for a vehicle.

Moreover, in the present embodiment, the structure for assembling a mirror device for a vehicle of the present invention is applied to the door mirror device 10 for a vehicle. However, the structure for assembling a mirror device for a vehicle of the present invention may be applied to a fender mirror device for a vehicle.

In the present embodiment, by using the engaging hooks 36 and the projecting hooks 48, the visor cover 28B is assembled to the visor rim 28A. However, the visor cover 28B may be assembled to the frame 12. With such a structure, the engaging hooks 36 (the pairs of nipping claws 38) can be omitted.

Figure 10:
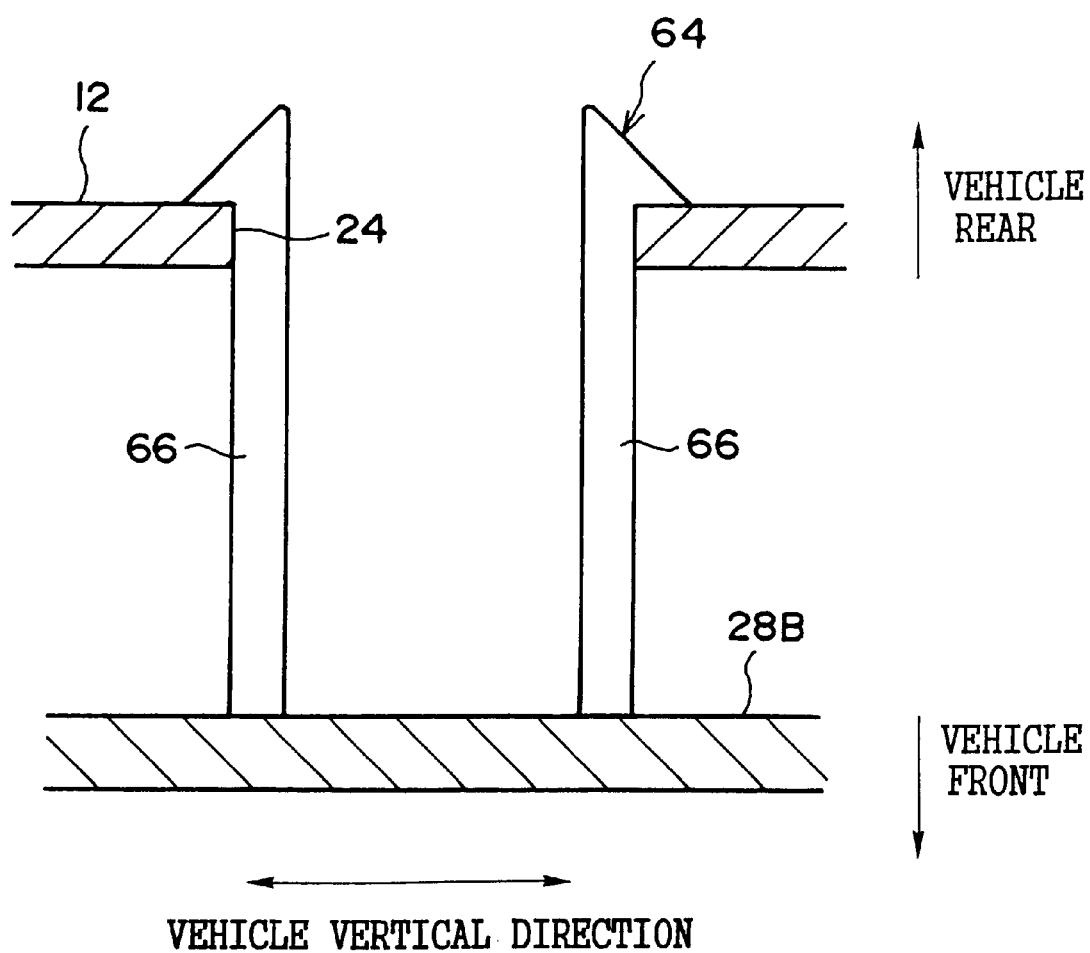
FIG. 10 is a cross-sectional view showing in detail an engaged state of a catching hook and an insert-through hole relating to another example of the door mirror device for a vehicle.

Specifically, for example, the structure illustrated in FIG. 10 may be used. Namely, in this structure, a predetermined number of catching hooks 64 are provided at the visor cover 28B in place of providing the predetermined number of projecting hooks 48. The catching hook 64 has a pair of catching claws 66 which are elastic. The pair of catching claws 66 stand erect, directed toward the frame 12 (toward the rear of the vehicle), and oppose one another in the vehicle vertical direction. The distal end of the vehicle upper side catching claw 66 projects toward the top of the vehicle, and the distal end of the vehicle bottom side catching claw 66 projects toward the bottom of the vehicle. The pair of catching claws 66 are inserted into the insert-through hole 24 of the frame 12 with the distal ends of the catching claws 66 catching on the insert-through hole 24. In this way, the pair of catching claws 66 push the frame 12 toward the front of the vehicle.

Moreover, the structure shown in FIG. 11 for example may be used. Namely, in this structure, a predetermined number of substantially box-shaped pedestals 68 are provided at the visor cover 28B, in place of providing the predetermined number of projecting hooks 48. The vehicle outer side one side surface or the vehicle inner side one side surface of the pedestal 68 is open. An insertion hole 70 is formed in the top wall of the pedestal 68, and is open toward the aforementioned one side surface side. A fit-together groove 72 is formed between the top wall and the upper portion in the pedestal 68. The fit-together groove 72 also is open toward the one side surface side.

A clip 74 is mounted to the pedestal 68. The clip 72 includes a rectangular base plate 76. The base plate 76 is inserted into the fit-together groove 72 from the one side surface side. A rectangular, plate-shaped standing plate 78 is provided upright, directed toward the frame 12 (toward the rear of the vehicle) at the base plate 76. The proximal end portion of the standing plate 78 is inserted into the insertion hole 70 from the one side surface side, simultaneously with the insertion of the base plate 76 into the fit-together groove 72. A pair of elastic claws 80 are provided at the distal end of the standing plate 78. The pair of elastic claws 80 each have a substantially V-shaped cross-section, and oppose each other along the vertical direction of the vehicle. The pair of elastic claws 80 are inserted into the insert-through hole 24 of the frame 12 in a state of catching on the insert-through hole 24. In this way, the pair of elastic claws 80 push the frame 12 toward the front of the vehicle.

In this case, the clip 74 can be prevented from falling out from the pedestal 68 by impeding rotation of the clip 74 with respect to the pedestal 68 by the base plate 76 of the clip 74 being fit-together with the fit-together groove 72 of the pedestal 68, or the like. Or, the clip 74 can be prevented from falling out by forming an impeding claw, which impedes falling out of the base plate 76 from the fit-together groove 72, at the one side surface side portion of the fit-together groove 72. In this way, the work for inserting the pairs of elastic claws 80 into the insert-through holes 24 can be facilitated.

(Second Embodiment)

A structure for assembling a door mirror of an automobile relating to a second embodiment of the structure for assembling a mirror device for a vehicle of the present invention will be described hereinafter on the basis of FIGS. 12 through 20.

Figure 13:
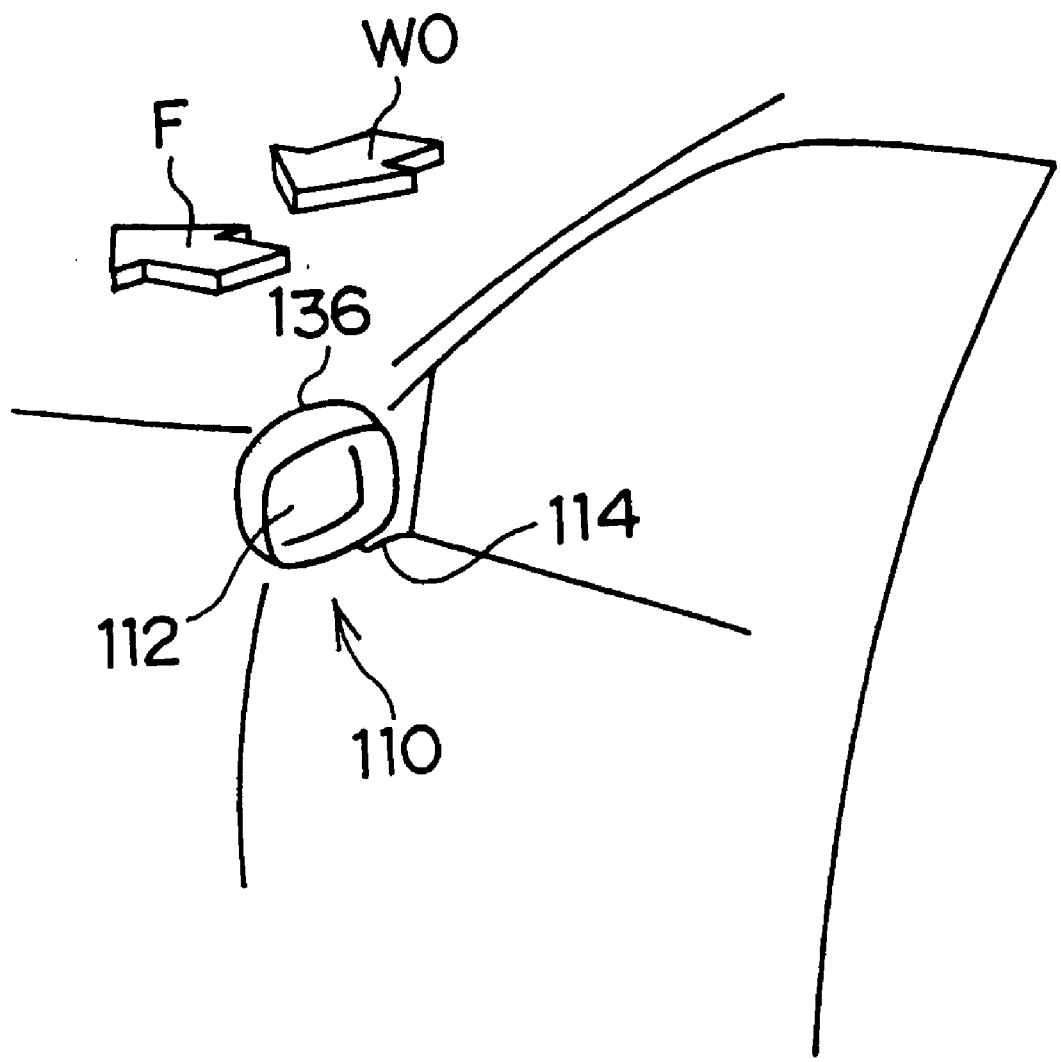
FIG. 13 is a view showing the door mirror device which is mounted to a door of an automobile.

As shown in FIG. 13, a door mirror device 110 of an automobile is equipped with a mirror 112 for visual confirmation of the region substantially at the rear of the vehicle. The mirror 112 is mounted to the exterior of a front door via a door mirror stay 114. In the drawings, the arrow WO points outwardly in the transverse direction of the vehicle, and the arrow F points in the forward direction of the vehicle.

Figure 14:
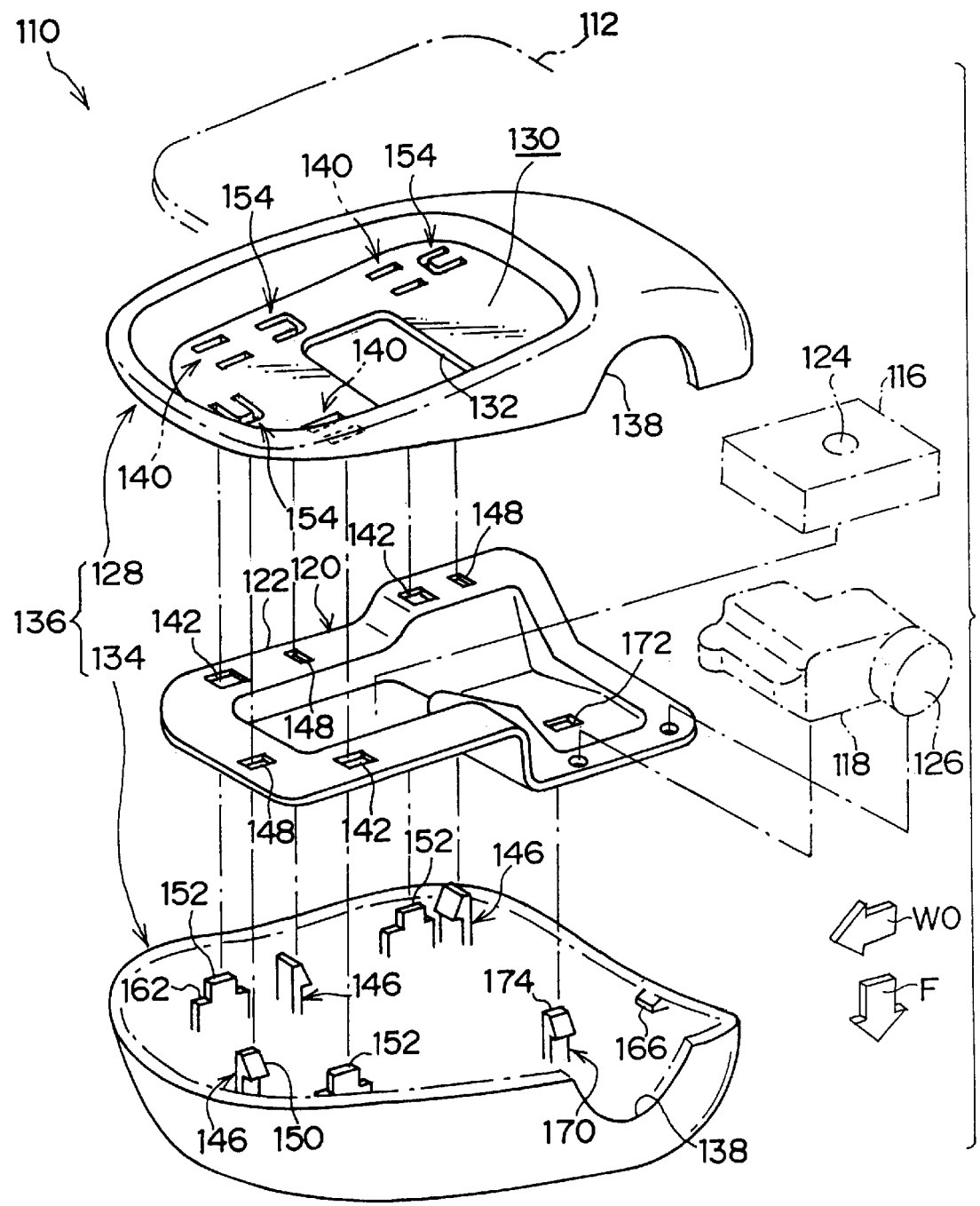
FIG. 14 is an exploded perspective view showing the structure for assembling a door mirror device of an automobile relating to the second embodiment.

As shown in FIG. 14, the angle of the mirror 112 can be adjusted by a mirror surface adjusting mechanism 116, and the mirror 112 can be collapsed by a retracting mechanism 118. The mirror surface adjusting mechanism 116 and the retracting mechanism 118 are mounted to a mirror frame 120. The mirror frame 120 is formed from metal and in a substantially rectangular configuration, and has a flange portion 122 at the periphery thereof. At one surface side of the mirror frame 120, the mirror surface adjusting mechanism 116 is positioned at the left side in FIG. 14, and the retracting mechanism 118 is positioned at the right side. The mirror 112 is detachably connected to and held at a driving portion 124 of the mirror surface adjusting mechanism 116. The retracting mechanism 118 is provided with a driving portion 126 which is rotatably supported by the door mirror stay 114.

A visor rim 128 is mounted to one surface side of the mirror frame 120. The visor rim 128 is shaped as a container whose mirror frame 120 side is open. A recessed region 130 is formed in the bottom outer surface of the visor rim 128. An opening 132 is formed in the central portion of the recessed region 130. The mirror 112 and the driving portion 124 of the mirror surface adjusting mechanism 116 are connected via the opening 132. The mirror is disposed in the recessed region 130 so as to be exposed.

A visor cover 134 is assembled to the other surface side of the mirror frame 120. The visor cover 134 is shaped as a container whose mirror frame 120 side is open. The visor cover 134, together with the visor rim 128, forms a mirror visor 136. In the state in which both the visor cover 134 and the visor rim 128 are assembled, the open ends thereof coincide, the mirror frame 120 is accommodated in the interior thereof, and the rear side of the mirror 112 is covered. Semicircular cut-outs 138, 138 are formed in the respective open end portions of the visor rim 128 and the visor cover 134, in order to form a circular opening by the both open end portions being matched together. This opening is used for the projecting of the driving portion 126 of the retracting mechanism 118.

The visor rim 128 and the visor cover 134 are both formed of a synthetic resin such as, for example, ABS resin (acrylonitrile butadiene styrene resin).

Figure 15:
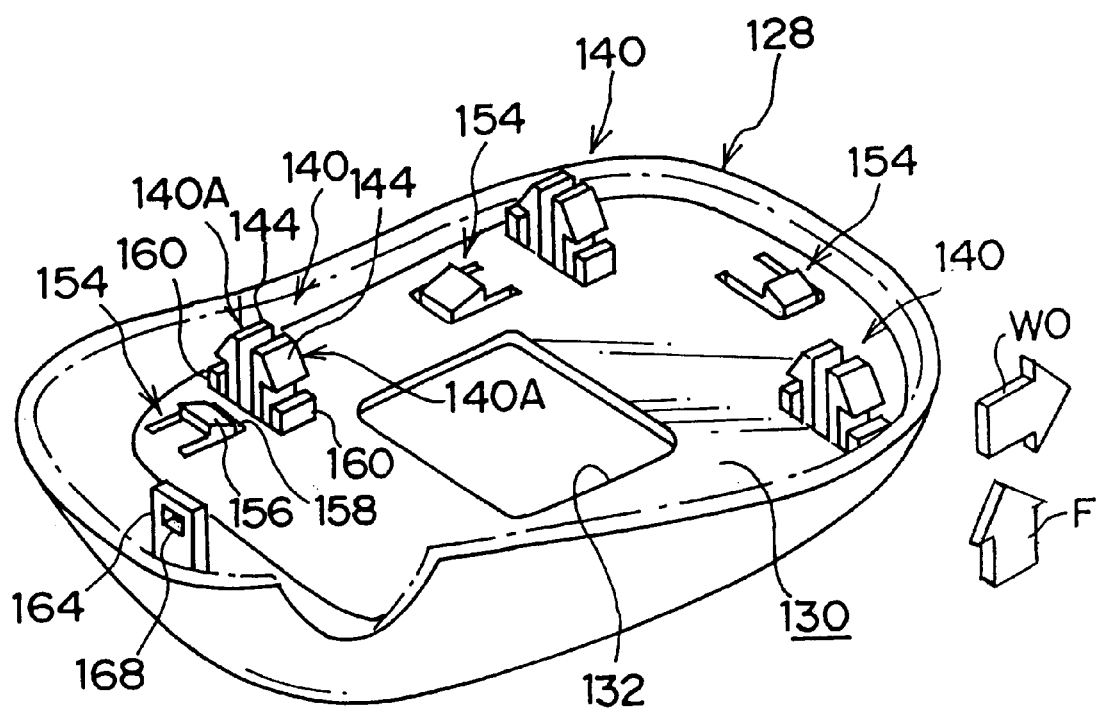
FIG. 15 is a perspective view of a visor rim, as seen from the side opposite that in FIG. 14, i.e., as seen from the inner side.

As shown in FIG. 15, anchor pair pieces 140, which form visor rim 128 side anchor pieces, are provided at the inner side of the visor rim 128. The anchor pair pieces 140 are provided at a total of three places at portions corresponding to the recessed region 130 of the visor rim 128. Each of the anchor pair pieces 140 is formed by a pair of pieces 140A, 140A which oppose one another with a space therebetween, and which extend toward the mirror frame 120.

First communicating portions 142, which are rectangular and which communicate the both surface sides of the mirror frame 120, are formed so as to be open in three places in the flange portion 122 of the mirror frame 120 in correspondence with the three anchor pair pieces 140.

Figure 16:
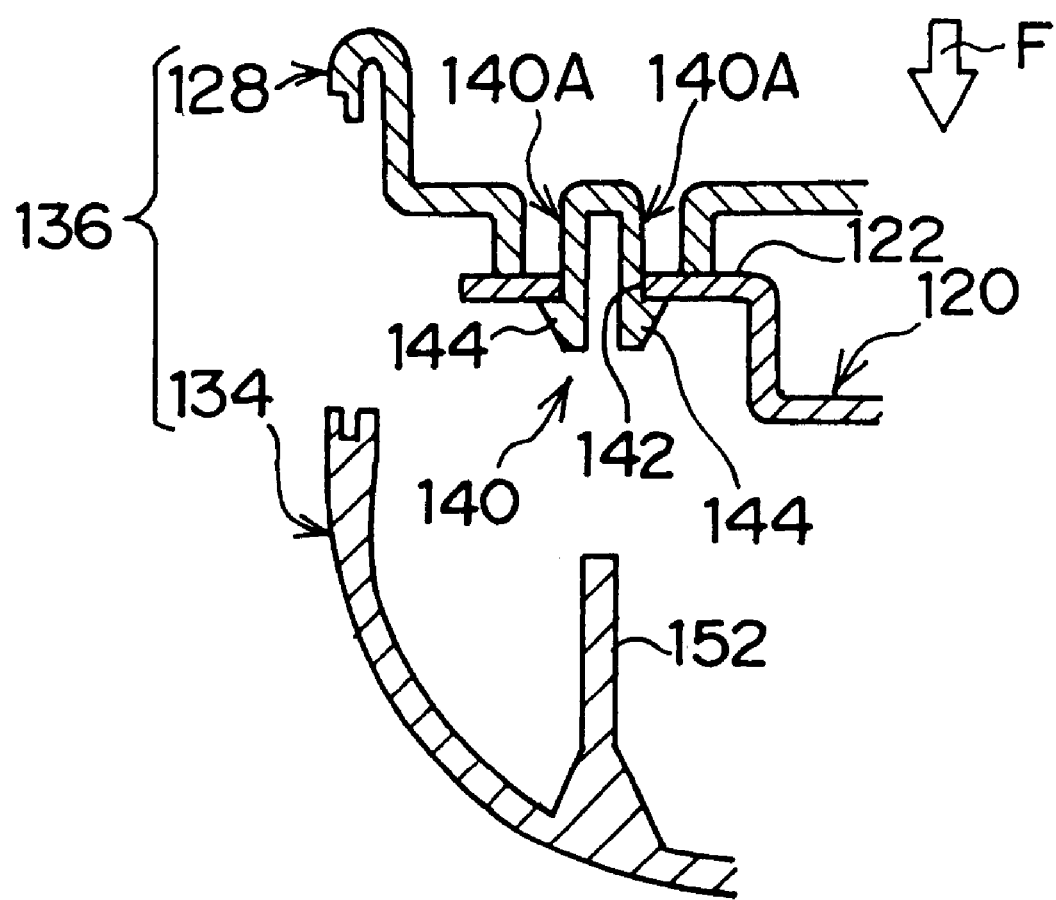
FIG. 16 is a partial end view of the door mirror device of an automobile relating to the second embodiment, and shows an anchored state of the visor rim side anchor piece with a mirror frame.

A projection 144 is formed at the extending distal end portion of each piece 140A of the anchor pair pieces 140, at the sides opposite the sides at which the respective pieces 140A of the anchor pair piece 140 face one another. As shown in FIG. 16, when the visor rim 128 is assembly moved toward the mirror frame 120 (i.e., when the visor rim 128 is moved toward the mirror frame 120 at the time of being assembled with the mirror frame 120), the projections 144 are pushed by the first communicating portions 142. In this way, the pieces 140A of the anchor pair piece 140 are deflected and elastically deformed such that the space therebetween decreases, and pass through the interior of the first communicating portion 142. When the projections 144 exit out to the visor cover 134 side from the first communicating portion 142, the pieces 140A of the anchor pair piece 140 deform so as to return to their original shapes, and the projections 144 abut and are anchored on the visor cover 134 side surface of the flange portion 122 of the mirror frame 120. At the limit of the projection 144 abutting the visor cover 134 side surface of the flange portion 122 of the mirror frame 120, pulling out of the anchor pair piece 140 from the first communicating portion 142 is impeded, i.e., separation from the visor rim 128 is impeded. Further, at the limit of the opening diameter of the first communicating portion 142, movement of the anchor pair piece 140 in the direction substantially orthogonal to the extending direction thereof is impeded. Namely, movement of the visor rim 128 in the sideways direction thereof (the direction substantially orthogonal to the direction of opposing the mirror frame 120) is impeded. In this way, the visor rim 128 is assembled to the mirror frame 120.

As shown in FIG. 14, visor cover 134 side anchor pieces 146 are provided at the inner side of the visor cover 134. The anchor pieces 146 are provided at a total of three places, and each extends toward the mirror frame 120.

Second communicating portions 148, which are rectangular and communicate the both surface sides of the mirror frame 120, are formed in three places in the flange portion 122 of the mirror frame 120 in correspondence with the three anchor pieces 146.

Figure 12A:
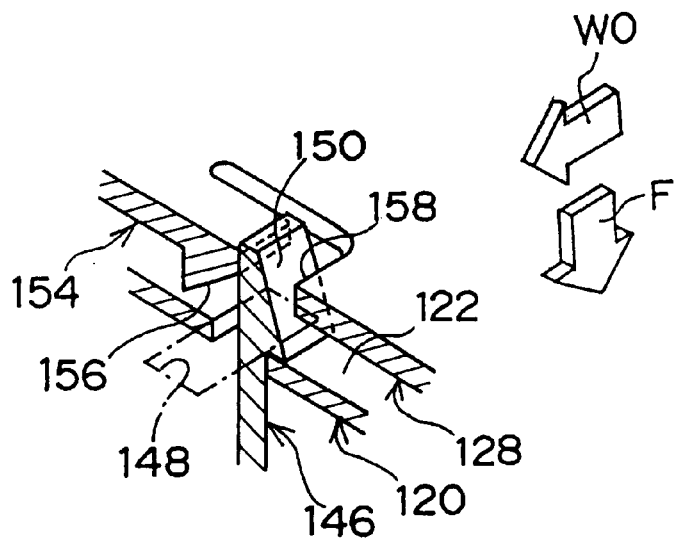
FIG. 12A is a partial cutaway perspective view of an assembled state of a structure for assembling a door mirror device of an automobile relating to a second embodiment of the structure for assembling a door mirror device for a vehicle of the present invention, and shows the relationship between a visor cover side anchor piece and a visor rim side impeding piece.
Figure 17:
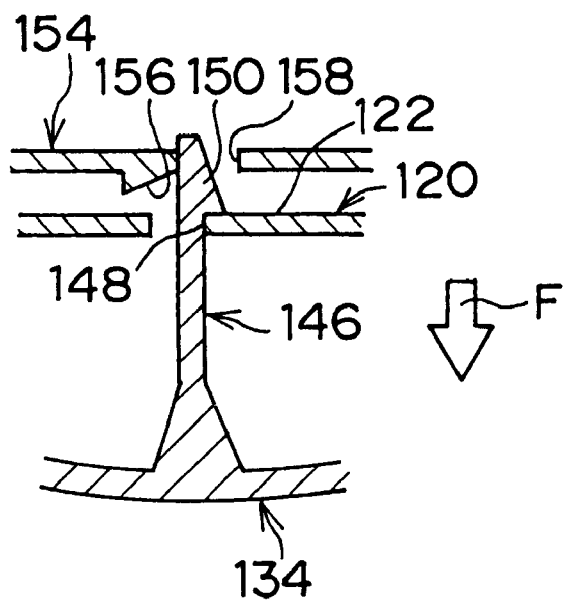
FIG. 17 is a partial end surface view of the door mirror device of an automobile relating to the second embodiment, and shows the relationship between the visor cover side anchor piece and the visor rim side impeding piece in an assembled state.

A projection 150 is formed at the extending distal end portion of the anchor piece 146, in a direction substantially orthogonal to the extending direction of the anchor piece 146. As shown in FIGS. 17 and 12A, when the visor cover 134 is assembly moved toward the mirror frame 120, the projections 150 are pushed by the second communicating portions 148. In this way, the anchor pieces 146 are deflected and elastically deformed in a direction substantially orthogonal to the extending direction, and pass through the interiors of the second communicating portions 148. When the projections 150 exit out to the visor rim 128 side from the second communicating portions 148, the anchor pieces 146 deform so as to return to their original shapes, and the projections 150 abut and are anchored on the visor rim 128 side surface of the flange portion 122 of the mirror frame 120. At the limit of the projections 150 abutting the visor rim 128 side surface of the mirror frame 120, pulling out of the anchor pieces 146 from the second communicating portions 148 is impeded, i.e., separation from the visor cover 134 is impeded. Further, at the limit of the opening diameter of the second communicating portions 148, movement of the anchor pieces 146 in the direction substantially orthogonal to the extending direction thereof is impeded. Namely, movement of the visor cover 134 in the sideways direction thereof (the direction substantially orthogonal to the direction of opposing the mirror frame 120) is impeded. In this way, the visor cover 134 is assembled to the mirror frame 120.

Figure 12B:
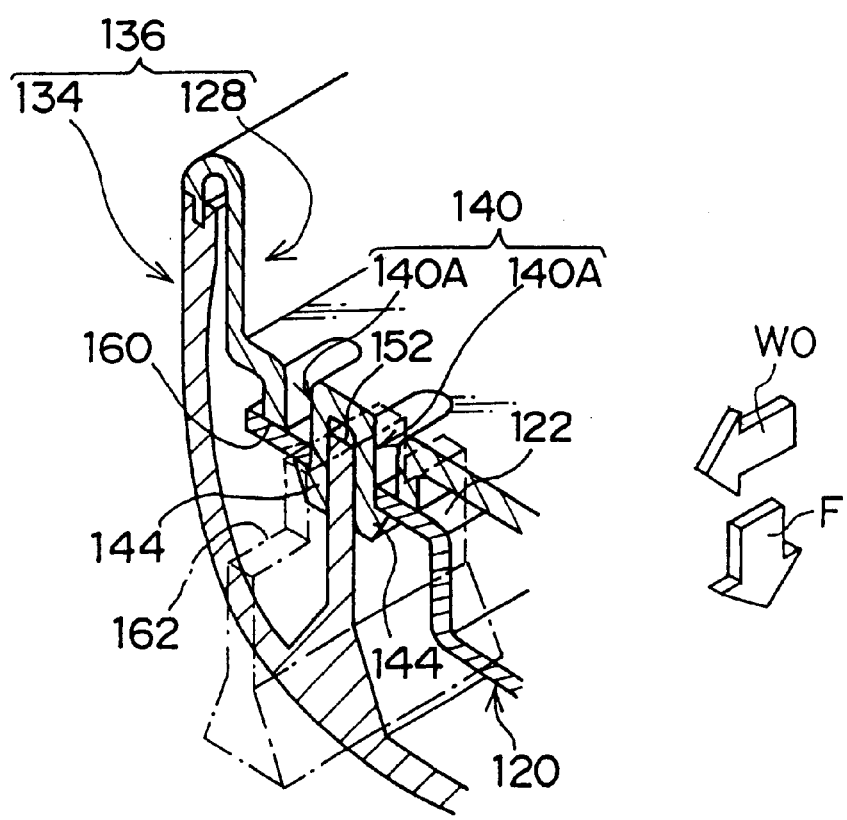
FIG. 12B is a partial cutaway perspective view of the assembled state of the structure for assembling a door mirror device of an automobile relating to the second embodiment of the structure for assembling a door mirror device for a vehicle of the present invention, and shows the relationship between a visor rim side anchor piece and a visor cover side impeding piece.
Figure 18:
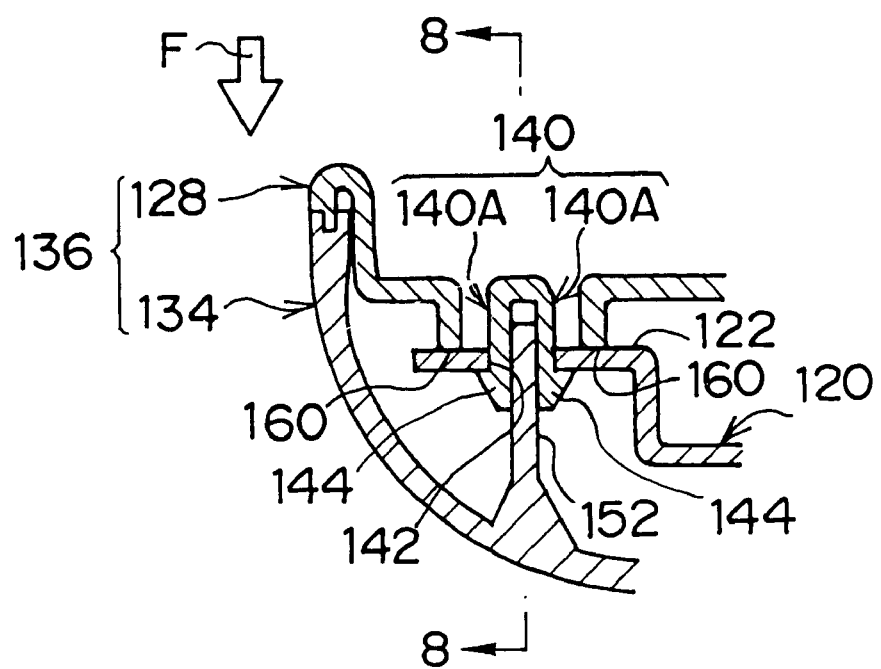
FIG. 18 is a partial end surface view of the door mirror device of an automobile relating to the second embodiment, and shows the relationship between the visor rim side anchor piece and the visor cover side impeding piece in an assembled state.

Fit-together pieces 152, which form impeding pieces, are provided at three places at the inner side of the visor cover 134, in correspondence with the anchor pair pieces 140 at the three places on the visor rim 128. As shown in FIG. 18 and FIG. 12B, each of the fit-together pieces 152 extends toward the mirror frame 120. Due to the assembly movement of the visor cover 134, the fit-together pieces 152 are press-fit between the pieces 140A of the anchor pair pieces 140. In this way, anti-anchoring deformation, which is required for canceling the anchoring of the anchor pair pieces 140, which narrows the space between the pieces 140A of the anchor pair pieces 140, is impeded.

As shown in FIG. 15, elastic pieces 154, which form impeding pieces, are provided at three places of the visor rim 128 in correspondence with the three visor cover 134 side anchor pieces 146. Each of the elastic pieces 154 is formed such that, at the bottom wall of the recessed region 130 of the visor rim 128, the periphery of the elastic piece 154 is open in a U-shape. The distal end portion of the elastic piece 154 extends in a direction substantially orthogonal to the extending direction of the visor cover 134 side anchor piece 146, and is provided with a projection 156 at the mirror frame 120 side thereof. As shown in FIG. 17 and FIG. 12A, due to the assembly movement of the visor cover 134, the visor cover 134 side anchor pieces 146 move toward the anchor pieces 154, and deform toward the proximal end sides of the elastic pieces 154. Due to this deformation, the extending distal end surfaces of the anchor pieces 146 abut the projections 156 of the elastic pieces 154. The elastic pieces 154 are pushed by the extending distal end surfaces of the anchor pieces 146, and deflect and elastically deform upward in FIG. 17 around the proximal end sides of the elastic pieces 154. The distal ends of the anchor pieces 146 enter into gaps 158 which are at the free end sides of the elastic pieces 154. When the anchor pieces 146 deform so as to return to their original states and their anchoring with the mirror frame 120 is completed, the extending distal end surfaces of the anchor pieces 146 separate from the projections 156 of the elastic pieces 154, and the anchor pieces 154 also deform so as to return to their original states. In this way, the distal end surfaces of the elastic pieces 154 abut the back surface sides of the projections 150 of the anchor pieces 146, and anti-anchoring deformation of the anchor pieces 146 (deformation needed to cancel the anchoring of the anchor pieces 146) can be impeded.

Figure 19:
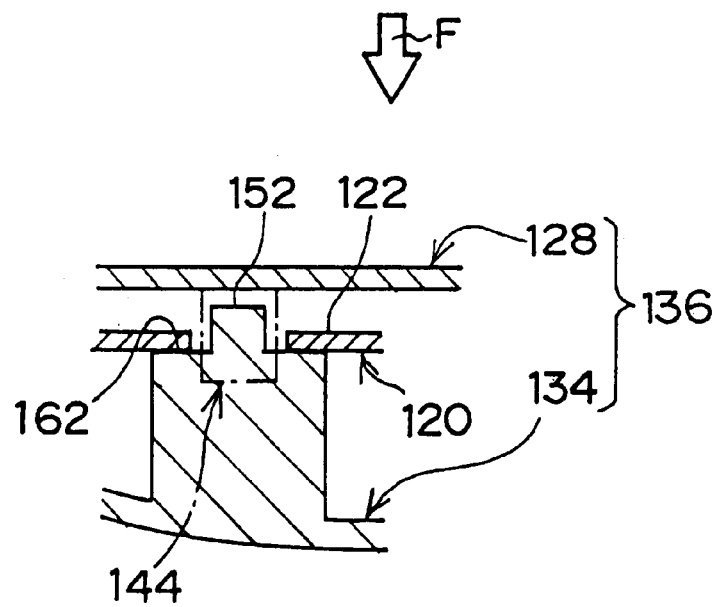
FIG. 19 is an end surface view taken along line 8—8 of FIG. 18.

As shown in FIG. 15, regulating pieces 160 are provided at the periphery of the anchor pair pieces 140 at the inner side of the visor rim 128. As shown in FIG. 14, regulating pieces 162 are formed integrally with the fit-together pieces 152 at the inner side of the visor cover 134. As shown in FIGS. 18 and 19, due to the assembly movement of the visor rim 128 and the visor cover 134, the regulating pieces 160, 162 abut the mirror frame 120. In this way, further movement of the visor rim 128 and the visor cover 134 toward the mirror frame 120 is impeded, and loosening of the visor rim 128 and the visor-cover 134 is prevented.

As shown in FIGS. 16 and 18, the open end portions of the visor rim 128 and the visor cover 134 are formed to abut and fit together mutually convexly and concavely. Further approaching movement of the visor rim 128 and the visor cover 134 in the directions in which they oppose each other is impeded, movement substantially orthogonal to the directions in which they oppose each other is impeded, and loosening of the visor rim 128 and the visor cover 134 is prevented.

Figure 20:
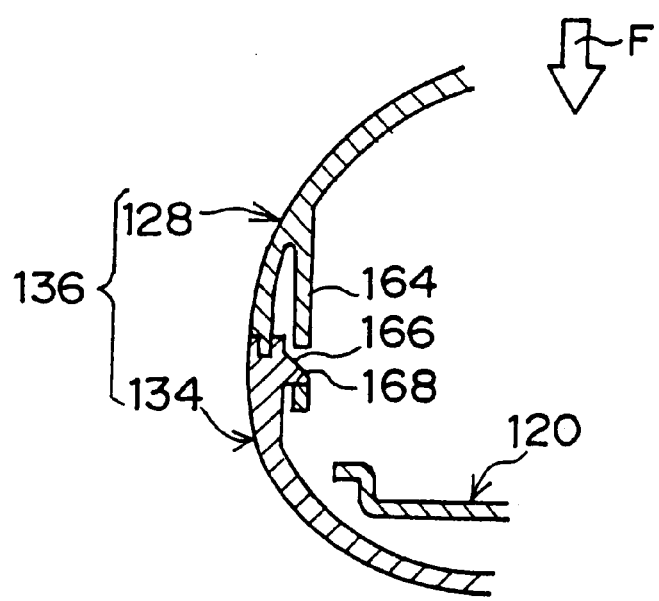
FIG. 20 is a partial end view of the door mirror device of an automobile relating to the second embodiment, and shows the relationship between a hook piece and a corresponding projection in an assembled state.

As shown in FIGS. 14, 15 and 20, a hook piece 164 and a corresponding projection 166, which engage with each other, are each provided at one place at the inner side at the open end portion of the visor rim 128 and the visor cover 134, respectively. The hook piece 164 is formed at the visor rim 128 side, and extends toward the visor cover 134. The corresponding projection 166 is formed at the visor cover 134 side, and projects in a direction substantially orthogonal to the extending direction of the hook piece 164. Due to the assembly movement of the visor rim 128 and the visor cover 134, the hook piece 164 elastically deforms, and the corresponding projection 166 engages with the interior of an opening 168 formed in the extending distal end portion of the hook piece 164.

Further, as shown in FIG. 14, an engaging hook 170 is provided at the inner side of the visor cover 134. The engaging hook 170 extends toward the mirror frame 120. At the extending distal end portion of the engaging hook 170, a projection 174 projects in a direction substantially orthogonal to the extending direction. An opening 172 is formed in the mirror frame 120 at a portion where the retracting mechanism 118 is positioned and in correspondence with the anchor hook 170. Due to the assembly movement of the visor cover 134, the anchor hook 170 elastically deforms, and the projection 174 engages with the inner side of the opening 172.

The engagement of the hook piece 164 of the visor rim 128 and the corresponding projection 166 of the visor cover 134, and the engagement of the engaging hook 170 of the visor cover 134 with the opening 172 of the mirror frame 120, as well as the anchor pair pieces 140, the fit-together pieces 152, the anchor pieces 146, and the elastic pieces 154 which are respectively provided in three places, strengthen the fastening force at the time of assembly, and strengthen the force for preventing loosening.

The anchor pair pieces 140, the elastic pieces 154, the regulating pieces 160, and the hook piece 164 are molded integrally with the visor rim 128. The anchor pieces 146, the fit-together pieces 152, the regulating pieces 162, the corresponding projection 166, and the engaging hook 1709 are molded integrally with the visor cover 134.

Next, operation of the second embodiment will be described.

Assembly is carried out as follows.

First, the mirror frame 120 is set in a reference jig.

Next, the visor rim 128 is assembly moved toward the mirror frame 120. Accompanying this movement, the anchor pair pieces 140 at the visor rim elastically deform and abut and engage on the first communicating portions 142 of the mirror frame 120. In this way, the visor rim 128 is assembled to the mirror frame 120.

Next, the visor cover 134 is assembly moved toward the mirror frame 120. Accompanying this movement, the anchor pieces 146 of the visor cover 134 elastically deform and abut and engage on the second communicating portions 148. In this way, the visor cover 134 is assembled to the mirror frame 120.

Due to the assembling of the visor rim 128 and the visor cover 134, the mirror frame 120 is housed, and the mirror visor 136, which covers the rear side of the mirror 112, is formed.

By assembly moving the visor rim 128 and the visor cover 134, the fit-together pieces 152 of the visor cover 134 pass through the first communicating portions 142, and abut and engage between the pieces 140A, 140A of the anchor pair pieces 140. Anti-anchoring deformation of the anchor pair pieces 140 of the visor rim 128 is impeded. Simultaneously, the visor rim 128 side elastic pieces 154 pass through the second communicating portions 148 and abut and engage with the anchor pieces 146 of the visor cover 134. Anti-anchoring deformation of the anchor pieces 146 of the visor cover 134 is impeded.

In this way, the assembly of the visor rim 128 and the visor cover 134 to the mirror frame 120 is strengthened. Further, the anchor pair pieces 140 and the elastic pieces 154 are molded integrally with the visor rim 128. The anchor pieces 146 and the fit-together pieces 152 are molded integrally with the visor cover 134. Assembly can be carried out without readying separate parts and tools. Even if the visor rim and the visor cover are formed of a synthetic resin, no excessive stress is applied thereto.

As a result, a reduction in the stress load applied to the mirror visor, a reduction in the number of parts, a reduction in the number of assembly processes, and facilitation of the assembly work are achieved.

Here, due to the assembly movement of the visor rim 128, the anchor pair pieces 140, which serve as visor rim side anchor pieces, abut and anchor on the second communicating portions 148, as the anchor pair pieces 140 elastically deform in directions of narrowing the gap between the pieces 140A, 140A of the elastic pair pieces 140. The space between the pieces 140A, 140A of the elastic pair pieces 140 varies during the operation of anchoring the anchor pair pieces 140. However, when the visor cover 134 is assembled, the operation of anchoring the anchor pair pieces 140 is already completed. Thus, the space between the pieces 140A, 140A of the anchor pair pieces 140 does not change. Accordingly, due to the assembly movement of the visor cover 134, the fit-together pieces 152, which serve as visor cover 134 side impeding pieces, easily abut and fit together between the pieces 140A, 140A of the anchor pair pieces 140. The fit-together pieces 152 are, for example, press-fit between the pieces 140A, 140A of the anchor pair pieces 140.

Due to the elastic pieces 154 which serve as visor rim 128 side impeding pieces, the visor cover 134 side anchor pieces 146 elastically deform and abut and engage with the mirror frame 120. The deformation thereof at this time is permitted by the elastic deformation of the elastic pieces 154. There are no obstacles to the visor cover 134 being assembled after the visor rim 128 is assembled.

After assembly, when the need arises to remove the visor rim 128 and the visor cover 134, it suffices to elastically deform the elastic pieces 154 and to carry out anti-anchoring deformation of the anchor pieces 152. This can be achieved by, after removing the mirror 112 from the mirror surface adjusting mechanism 116, inserting a tool, such as a standard screwdriver or the like, from the U-shaped opening (including the gap 158) formed at the periphery of the elastic piece 154, and deforming the elastic piece 154 outwardly in the direction in which anti-anchoring deformation of the anchor piece 152 is permitted.

The portion of the visor rim 128 which corresponds to the rear surface of the mirror 112 is usually hidden by the mirror 112. Places which can abut the elastic pieces 154 can be formed at this portion. This does not in any way affect the external appearance and design of the mirror visor 136.

The present invention is not limited to the above-described second embodiment. In the second embodiment, the assembly of the visor rim is carried out before the assembly of the visor cover. However, provided that there are impeding pieces, which impede anti-anchoring deformation of the visor rim side anchor pieces, at the visor cover, and that there are impeding pieces, which impede anti-anchoring deformation of the visor cover side anchor pieces, at the visor rim, a structure in which assembly is carried out in the opposite order or assembly is carried out simultaneously is possible.

Further, in the second embodiment, the anchor pieces and the impeding pieces are respectively provided at three places. However, the number of places, the positions, the configurations, and the like are not limited to those described in the above embodiment. Further, although the present invention relates to a door mirror device of an automobile, it may also be applied to another mirror device for a vehicle, such as a fender mirror device or the like.

In the structure for assembling a mirror device for a vehicle of the first aspect of the present invention, the first impeding device does not apply elastic force to the frame at the time of impeding relative movement, in the vehicle longitudinal direction, of the mirror visor and the frame. Thus, it is possible to prevent the mirror visor from receiving stress from the frame and breaking.

Further, the mirror visor and the frame are assembled by the elastic hooks, the rigid hooks and the first impeding device. Thus, costs can be lowered and the assembly work can be facilitated.

In the structure for assembling a mirror device for a vehicle of the second aspect of the present invention, the visor cover and the visor rim can be assembled by the engaging hooks, the projecting hooks, and the impeding device. Thus, costs can be lowered, and the assembly work can be facilitated.

In the structure for assembling a mirror device for a vehicle of the second aspect of the present invention, preferably, at least one of the engaging surfaces of the nipping claws and the engaged surfaces of the widened portion are formed as inclined surfaces. Thus, the nipping claws can always satisfactorily push the widened portion toward the rear of the vehicle.

In a more preferable structure for assembling a mirror device for a vehicle, the visor cover and the visor rim can easily be removed by inserting, for example, a screwdriver or pliers in the gap formed between the open hole and the projecting hook side end surface of the nipping claw.

In a more preferable structure for assembling a mirror device for a vehicle, the visor cover and the visor rim can be easily removed by applying force to the projecting portion of the nipping claw from the widened portion and making the nipping claw move away from the widened portion.

As described above, in accordance with the structure for assembling a mirror device for a vehicle relating to the present invention, a mitigation of the stress load applied to the mirror visor, a reduction in the number of parts, a reduction in the number of assembly processes, and facilitation of the assembly work can be achieved.

What is claimed is:

1. A mirror device assembly for a vehicle, the mirror device assembly comprising:
   a mirror and a mirror visor which covers a vehicle front side of the mirror for visual confirmation of a region substantially toward a rear of the vehicle;
   a frame disposed in an inner portion of the mirror visor and connected to the mirror and connected to the vehicle for fixing the mirror visor and the mirror to the vehicle body;
   an elastic hook provided at the mirror visor, which applies to the frame elastic force in a direction substantially orthogonal to a vehicle longitudinal direction of the vehicle;
   a rigid hook provided at the mirror visor in correspondence with the elastic hook, and which is rigid, which receives elastic force applied to the frame by the elastic hook and which nips a peripheral edge of the frame opposite from the elastic hook to hold the frame; and
   a first impeding device provided at at least one of the mirror visor and the frame, which impedes relative movement, in the vehicle longitudinal direction, of the mirror visor and the frame without applying elastic force to the frame,
   wherein the mirror visor has a substantially box-shaped pedestal and a clip which is mounted to the pedestal and extends toward the frame, and the frame has an insert-through hole which corresponds to the clip, and a distal end of the clip is formed as an elastic claw, and due to the clip being inserted into the insert-through hole and the elastic claw being inserted in and catching on the insert-through hole, the clip pushes the frame toward a front of the vehicle.

2. A mirror device assembly for a vehicle, the mirror device assembly comprising:
   a mirror and a mirror visor, the mirror visor including a vehicle front side visor cover and a vehicle rear side visor rim assembled to one another, and which covers a vehicle front side of the mirror for visual confirmation of a region substantially toward a rear of the vehicle;
   a projecting hook provided at one of the visor cover and the visor rim, the projecting hook including a distal end which projects and a widened portion which widens toward both sides of the distal end;
   an engaging hook which corresponding to the projecting hook, the engaging hook comprising a pair of elastic nipping claws, and which is provided at another of the visor cover and the visor rim, and which engages with the widened portion due to the pair of nipping claws nipping the widened portion; and
   an impeding device provided at at least one of the visor cover and the visor rim, and which impedes relative movement, in a longitudinal direction of the vehicle, of the visor cover and the visor rim when mounted to the vehicle.

3. The mirror device assembly of claim 2, wherein at least one of surfaces of the nipping claws which engage the widened portion and surfaces of the widened portion which are engaged by the nipping claws, comprise inclined surfaces.

4. The mirror device assembly of claim 2, wherein the impeding device includes a fit-together projection provided at the visor cover, and a projecting portion provided at the visor rim, with the projecting portion including a fit-together hole and the fit-together projection and the fit-together hole being fit-together with one another.

5. The mirror device assembly of claim 3, further comprising an open hole in a widening direction end edge of the widened portion, with a gap being disposed between the open hole and a projecting hook side end surface of the nipping claw.

6. The mirror device assembly of claim 3, wherein the nipping claws project from the widened portion substantially orthogonally with respect to the directions of widening.

7. A mirror device assembly for a vehicle, the mirror device assembly comprising:
   a mirror;
   a mirror frame mountable to a vehicle, the mirror frame including surface sides with one surface side holding the mirror, the mirror and the one surface side of the mirror frame opposing one another;
   a visor rim which exposes the mirror to the environment, and which opposes the one surface side of the mirror frame;
   a visor cover which opposes another surface side of the mirror frame, and which, together with the visor rim, forms a mirror visor which accommodates the mirror frame and covers the mirror;
   a first communicating portion which is formed in the mirror frame and which defines a path of fluid communication from one surface side of the mirror frame to another surface side of the mirror frame;
   a visor rim side anchor piece formed integrally with an inner side of the visor rim so as to extend toward the mirror frame, and when the visor rim is assembled to the mirror frame, the visor rim side anchor piece elastically deforms in a direction substantially orthogonal to an extending direction of the visor rim side anchor piece and abuts and anchors on the first communicating portion;
   a second communicating portion which is formed in the mirror frame and which defines a path of fluid communication from one surface side of the mirror frame to another surface side of the mirror frame;
   a visor cover side anchor piece formed integrally with an inner side of the visor cover so as to extend toward the mirror frame, when the visor cover is assembled to the mirror frame, the visor cover side anchor piece elastically deforms in a direction substantially orthogonal to an extending direction of the visor cover side anchor piece and abuts and anchors on the second communicating portion;

a visor cover side impeding piece formed integrally with the visor cover, and when the visor rim and the cover are assembled to one another, the visor cover side impeding piece, via the first communicating portion, abuts and engages with the visor rim side anchor piece so as to impede anti-anchoring deformation of the visor rim side anchor piece; and a visor rim side impeding piece formed integrally with the visor rim, and when the visor cover and the rim are assembled to one another, the visor rim side impeding piece, via the second communicating portion, abuts and engages with the visor cover side anchor piece so as to impede anti-anchoring deformation of the visor cover side anchor piece.

8. The mirror device assembly for a vehicle of claim 7, wherein one of the visor rim and the visor cover is assembled before one other, and the anchor piece of the one of the visor rim and the visor cover which is assembled first comprises a pair of anchor pair pieces which oppose one another and are set apart from one another and whose direction of being set apart from one another is a direction of anti-anchoring deformation, and the impeding piece of the other of the visor rim and the visor cover which is assembled after comprises a fit-together piece which is fit together between pieces of the anchor pair pieces, and the impeding piece of the one of the visor rim and the visor cover which is assembled first comprises an elastic piece which elastically deforms in accordance with deformation needed to anchor the anchor piece of the other of the visor rim and the visor cover which is assembled after, and which permits said deformation needed for anchoring.

9. The mirror device assembly for a vehicle of claim 8, wherein the one of the visor rim and the visor cover which is assembled first is the visor rim, and the other of the visor rim and the visor cover which is assembled after is the visor cover.

10. The mirror device assembly for a vehicle of claim 8, wherein the one of the visor rim and the visor cover which is assembled first is the visor cover, and the other of the visor rim and the visor cover which is assembled after is the visor rim.

11. A method for assembling a mirror device for a vehicle, which mirror device includes a visor rim and a frame, the method comprising the steps of:

(a) fixing the frame in a jig; and (b) sandwiching a receiving portion of the frame between a plurality of engaging projections of an elastic hook provided at the visor rim to hold a peripheral edge of the frame with the elastic hook, and thereafter, engaging a rigid hook of the visor rim with a rigid receiving portion of the frame to assembly the visor rim to the frame, wherein the mirror device includes a visor cover, further comprising the step of inserting, in to an insert-through hole of the frame, a clip which is mounted to a pedestal provided on the visor cover, and catching a distal end of the clip on the insert-through hole and pushing the frame toward a front of a vehicle when the mirror device is mounted thereto, for assembling the visor cover to the frame.

12. A method for assembling a mirror device for a vehicle which mirror device includes a visor rim, a frame, and a visor cover, the method comprising the steps of:

(a) fixing the frame in a jig; and (b) elastically deforming anchor pair pieces provided at one of the visor rim and the visor cover, and abutting and anchoring the anchor pair pieces abut and anchor in an aperture in the frame to assemble one of the visor rim and cover to the frame.

13. The method of claim 12, wherein the step of elastically deforming anchor pair pieces includes abutting projections at distal ends of the anchor pair pieces against a flange portion of the frame.

14. The method of claim 12, further comprising the step inserting a fit-together piece of the visor cover in an aperture in the frame, and abutting and engaging the fit-together piece between the anchor pair pieces of the visor rim.

15. The method of claim 14, wherein the step of inserting a fit-together piece includes inserting an elastic piece of the visor rim into another aperture in the frame, and engaging the elastic piece with an anchor piece of the visor cover.

* * * * *